United States Patent
Sarkesain

(10) Patent No.: US 11,516,244 B2
(45) Date of Patent: Nov. 29, 2022

(54) DYNAMICALLY-ADAPTIVE-RESILIENT MEASURED CYBER PERFORMANCE AND EFFECTS THROUGH COMMAND AND CONTROL INTEGRATION OF FULL SPECTRUM CAPABILITIES

(71) Applicant: John F. Sarkesain, Ashburn, VA (US)

(72) Inventor: John F. Sarkesain, Ashburn, VA (US)

(*) Notice: Subject to any disclaimer, the term of this patent is extended or adjusted under 35 U.S.C. 154(b) by 429 days.

(21) Appl. No.: 16/829,377

(22) Filed: Mar. 25, 2020

(65) Prior Publication Data
US 2020/0244694 A1    Jul. 30, 2020

Related U.S. Application Data

(62) Division of application No. 15/161,907, filed on May 23, 2016, now abandoned.
(Continued)

(51) Int. Cl.
*G06F 7/00* (2006.01)
*H04L 9/40* (2022.01)
(Continued)

(52) U.S. Cl.
CPC ......... *H04L 63/1433* (2013.01); *G06Q 10/06* (2013.01); *H04L 63/1408* (2013.01);
(Continued)

(58) Field of Classification Search
CPC ......... G06F 21/55; H04L 67/10; H04L 67/12; H04L 41/145; H04L 63/302; H04L 67/1097
See application file for complete search history.

(56) References Cited

U.S. PATENT DOCUMENTS

| 7,533,128 B1* | 5/2009 | Sanchez | G06F 16/20 707/999.102 |
| 2005/0222811 A1* | 10/2005 | Jakobson | H04L 41/0631 702/183 |

(Continued)

OTHER PUBLICATIONS

Gerardo Pardo-Castellote, Omg Data Distribution Service: Real-Time Publish Subscribe Becomes A Standard, Jan. 2005 (Jan. 1, 2005) (Year: 2005).*

(Continued)

*Primary Examiner* — Chirag R Patel
(74) *Attorney, Agent, or Firm* — Dunlap Bennett & Ludwig, PLLC

(57) ABSTRACT

System-of-systems architectures and methods for dynamically and adaptively managing and executing a command and control system across a global cyber enterprise are provided. The system-of-systems architecture integrates, synchronizes and executes with kinetic operations employing an adaptive and dynamic mixing and matching of capabilities for optimal effects in near real time so as to measure and maximize effects across the global cyber enterprise. The methods incorporate execution of a Cyber Operations "CyberOps" Chain of interlocking management cycles for the integration with a kinetic "Kill Chain" to optimize cyber/kinetic integration and mission outcomes. An analytical and software framework enables the on-demand formation of mission-specific dynamic cell groups from various cells stretching across the global cyber enterprise in response to ever-changing faces of cyber threats.

15 Claims, 25 Drawing Sheets

Related U.S. Application Data

(60) Provisional application No. 62/165,391, filed on May 22, 2015.

(51) Int. Cl.
    *G06Q 10/06* (2012.01)
    *H04L 67/01* (2022.01)
    *H04L 67/1097* (2022.01)

(52) U.S. Cl.
    CPC .......... *H04L 63/1441* (2013.01); *H04L 67/01* (2022.05); *H04L 67/1097* (2013.01); *H04L 63/302* (2013.01)

(56) References Cited

U.S. PATENT DOCUMENTS

| | | | | |
|---|---|---|---|---|
| 2010/0241717 A1* | 9/2010 | Hawkins | ................ | G06F 9/542 709/206 |
| 2013/0055294 A1* | 2/2013 | Diebner | ................ | G06F 9/541 719/328 |

OTHER PUBLICATIONS

Schmidt, Douglas & Birman, Ken & Reiter, Mike. (2006). Prometheus: Enhancing the Quality of Service of the Joint Battlespace Infosphere. 78 (Year: 2006).*

W. Kang, K. Kapitanova and S. H. Son, "RDDS: A Real-Time Data Distribution Service for Cyber-Physical Systems," in IEEE Transactions on Industrial Informatics, vol. 8, No. 2, pp. 393-405, May 2012, doi: 10.1109/TII.2012.2183878 (Year: 2012).*

Soroush, H., Irey, P., & Pardo-Castellote, G. (2015). Next-Generation Cybersecurity for Advanced Real-Time Distributed Systems. Intelligent Ships Symposium. (Year: 2015).*

\* cited by examiner

DYNAMICALLY-ADAPTIVE-RESILIENT MEASURED CYBER PERFORMANCE AND EFFECTS THROUGH COMMAND AND CONTROL INTEGRATION OF FULL SPECTRUM CAPABILITIES

CROSS-REFERENCE TO RELATED APPLICATION

This divisional application claims the benefit of priority of U.S. non-provisional application Ser. No. 15/161,907, filed 23 May 2016, the contents of which are herein incorporated by reference.

BACKGROUND OF THE TECHNOLOGY

1. Statement of the Technical Field

The technology arrangement relates to cyber operations and cyber security integration, and more particularly to the integration, dynamic control, "on demand" adaptability and optimization of cyber effects of all integrated cyber capabilities and their measured outcomes across a global enterprise or cyber operations domain.

2. Description of the Related Art

The current weakness of cyber security and cyber operations lies in lack of a system and/or SoSs implementation architectural strategy, implementation of point solution cyber security controls that lack federation or dynamic adaptability, the lack of integration of all cyber capabilities (i.e., defensive cyber operations, offensive cyber operations, network operations, cyber security controls, and most importantly, a lack of a dynamic adaptable Cyber C2 system/SoSs that can manage all cyber capabilities and dynamically adapt in near real-time (NRT) to an emerging threats and rapidly integrate (i.e., mix, match and synchronize cyber capabilities) to optimize and measure performance and effects against that threat.

Any system or SoSs that has elements and capabilities with a common objective (i.e., cyber security and operations) to defend a computing networks must have C2 to synchronize and optimize the effects of the elements and/or capabilities. Consider an offensive football squad without a command and control (i.e., their coach and quarterback). Plays are called with each player acting in a federated manner executing their role or assignment on the play. Consider the case, where each player just acted against the defensive he chooses, without regard for an orchestrated play to optimize the effects against the defense. Further, when a quarterback changes a play at the line of scrimmage, he is dynamically adapting in NRT to the defensive formation with the intent of maximizing the offensive capabilities against the defense he currently sees. In a similar manner systems and SoSs must have command and control to maximize their opportunities for effectiveness. Command and control exist in business, the military, society and sports, it must also exist in cyber if necessary and desire effects are to be achieved. Further, because of the inherent behaviors, dynamics and speeds of cyberspace, its architecture must be highly congruent and adaptable with behaviors and properties of cyberspace itself.

The present invention extends the architecture to include cyber offensive operations and the definition of the C2 model of dynamically tuning architecture (i.e., creating high congruence between the operational and system/SoSs C2 architecture) by NRT configurations (i.e., instantiating multiple C2 forms with mixed and matched capabilities to optimize effects and a new utility: performance based effects to measure the performance of the dynamics by contrasting measure of performance (MOPs) and measures of effects (MOEs). A "CyberOps Chain" (a special case of the information value chain) was defined as the analytical framework to conduct and assess MOPs to MOEs analysis. Also included is a new model to assess operators' knowledge, skills and abilities (KSAs) as an input to the performance based effects analysis. A rating metric of tools and capabilities is also a new and input variable to the MOPs and MOEs performance based effects analysis. Further, formal definitions of cyber and kinetic operations C2 integration structures are defined to support Cyber and kinetic warfare C2 integration M&S and emulations scenarios.

SUMMARY OF INVENTION

Embodiments of the invention concerns systems and SoSs methods and architectures (operational and system/SoSs) that conduct full spectrum C2/BM cyber operations—the essence of this invention is the integration of new and old methods and architecture to create integrated methods and architectures for conducting C2/BM. The integration of and the dynamic ability to mix and match offensive cyberspace operations capabilities, defensive cyberspace operations capabilities, network operations tools and capabilities, computer network exploitation capabilities and cyber security controls (e.g., reference NIST 800-53) to optimize effects against existing and emerging threats is central to the invention—this is referred to as tuning the architecture herein. Further the methods and architecture can integrate kinetic operations (e.g., Naval Operations, Army Operations), lethal or non-lethal to span C2/BM over the full spectrum of military capabilities. The methods and architecture dynamically "tune" in NRT based on the mission or threat at any moment to mix and match the systems' or SoSs capabilities to high level of congruence with the mission or threat (i.e., tailoring the architecture optimize mission outcomes).

An analytical framework (AF) is defined (i.e., the Cyber Operation Chain, CyberOps Chain) to provide structure and guide the C2/BM processes enabled by the operational and system/SoSs architecture. The CyberOps chain is characterized by two interlocking process cycles that intersect at an operations transition state and information feedback loops, which reinitiate the cycles when desired effects are not met. The operational phases of the analytical framework include situational awareness (SA) at any moment in time and space, mission planning, course of action (COA) and COA selection, a transition to mission execution, battle damage assessment (BDA) and feedback loops to update SA. The analytical framework provides the basis for developing measure of performance (MOPs) and measure of effectiveness (MOEs) for missions. Further, each phase of the AF can have its own associated MOPs and MOEs, or subsets of phases may have associated MOPs and MOEs or MOPs and MOEs can be defined for the entire CyberOps Chain. MOPs to MOEs analysis can then be conducted to perform thresholds of performance necessary to achieve intended effects (e.g., How much more performance; i.e., more tuning the architecture, is necessary to achieve the desires effects.

In one aspect of the present invention, a cyber command and control system for a global computing environment includes: a plurality of global shared data spaces configured for selectively storing and retrieving cyber data according to a plurality of topics; a plurality of virtual cells and at least one commander cell, each cell having at a set of capabilities and at least one computing device electronically connected to at least one local shared data space, a suite of applications and a message platform, wherein each computing device is configured to selectively collect and message cyber data according to at least one mission-specific topic of the plurality of topics; the messaging platform configured to transmit messaged cyber data according to a predetermined message configuration; a system-of-systems architecture configured to (a) implement a peer-processing configuration across each shared data space, each computing device, and each suite of applications; and (b) implement a global sharing configuration of each local shared data space with the plurality of global shared data spaces; and a user interface integrating with each cell for the at least one commander cell to selectively establish (a) a predetermined mission that defines the at least one mission-specific topic; and (b) the predetermined message configuration.

In another aspect of the present invention, the cyber command and control system for a global computing environment further includes: wherein the plurality of global data spaces further includes a central data store across which the system-of-systems architecture is configured to implement the peer-processing configuration and the global sharing configuration, wherein the plurality of global shared data spaces is virtual, wherein the plurality of virtual global shared data spaces is cloud based, wherein the predetermined message configuration is at least one of a publish-subscribe and a request-reply message configuration, wherein the predetermined message configuration is a publish-subscribe message configuration, wherein the predetermined message configuration is only a publish-subscribe message configuration, wherein the predetermined message configuration is a request-reply message configuration, wherein the system-of-systems architecture is configured to implement only the peer-processing configuration, wherein the system-of-systems architecture is configured to implement only the global sharing configuration, wherein the system-of-systems architecture is configured to implement only the peer-processing configuration, and only the global sharing configuration, further including at least one dynamic cell formed from a portion of the plurality of virtual cells by comparing each respective set of capabilities to the predetermined mission, wherein the at least one dynamic cell is reformed when the predetermined mission is re-established through the user interface, wherein the user interface is configured to measure a performance output of the at least one dynamic cell, further including an analytic database connected to the user interface, wherein the analytic database is configured to dynamically adapt the predetermined mission base in part on the performance and effects output.

In yet another embodiment of the present invention, a cyber-physical command and control system or systems of systems for a global computing environment includes: a plurality of global shared data spaces configured for selectively storing, retrieving, publishing and subscribing to cyber-physical data according to a plurality of topics-based, and content-based and request-reply criteria; at least one centralized data store; a plurality of operational virtual or physical cells and at least one commander cell, each cell having at a set of missions and mission capabilities and at least one computing device electronically connected to at least one local shared data space, a suite of applications and a message platform, wherein each computing device is configured to selectively publish, subscribe, or retrieve cyber-physical message data according to at least one mission-specific topic-based, content-based or retrieve criteria of the plurality of topics and criteria; the messaging platform configured to transmit messaged cyber-physical data according to a predetermined message configuration; a system-of-systems architecture configured to (a) implement a peer-processing configuration across each shared data space, each computing device, and each suite of applications; and (b) implement a global sharing configuration of each local shared data space and centralized data store with the plurality of global shared data spaces and the at least one centralized data store; an operational architecture comprised of a virtual, physical, or combination of virtual and physical operational architecture; a user interface integrating with each cell for at least one commander cell to selectively establish (a) a dynamic mission that defines at least one mission-specific topic-based; content-based or request-reply criteria, and (b) the dynamic message configuration; and an analytical framework that enables the definition of, development of, and measurement of system architecture, operational architecture and more typically, integrated operational and system architectural performance and effects measurements; measure of static and or dynamic system or system of systems configuration, wherein the present invention forms and reforms command and control structure across disparate organizational and network boundaries with at least one commander cell and at least one mission cell, wherein the present invention dynamically subscribes, publishes or retrieves cyber-physical data, establishes at least one commander cell, at least one, or plurality of mission cells, and capabilities is based on predetermined mission requirements or emerging requirements to optimize and measure performance and effects, wherein the preset invention statically or dynamically establishes any and all integrated or non-integrated combinations of cyber-physical data, cell organization and relationships, C2 forms and structures, and cyber-physical capabilities, and wherein the present invention enables and provides for the development of, and measurement of, all any and all operational and system-software architectural combinations of performance and effects metrics and measurements of the system or system of systems implementation.

These and other features, aspects and advantages of the present invention will become better understood with reference to the following drawings, description and claims.

BRIEF DESCRIPTION OF DRAWINGS

Embodiments will be described with references to the following drawing and figures, in which like numerals represent like items throughout the drawings and figures, and in which.

DETAILED DESCRIPTION

Figure 1:
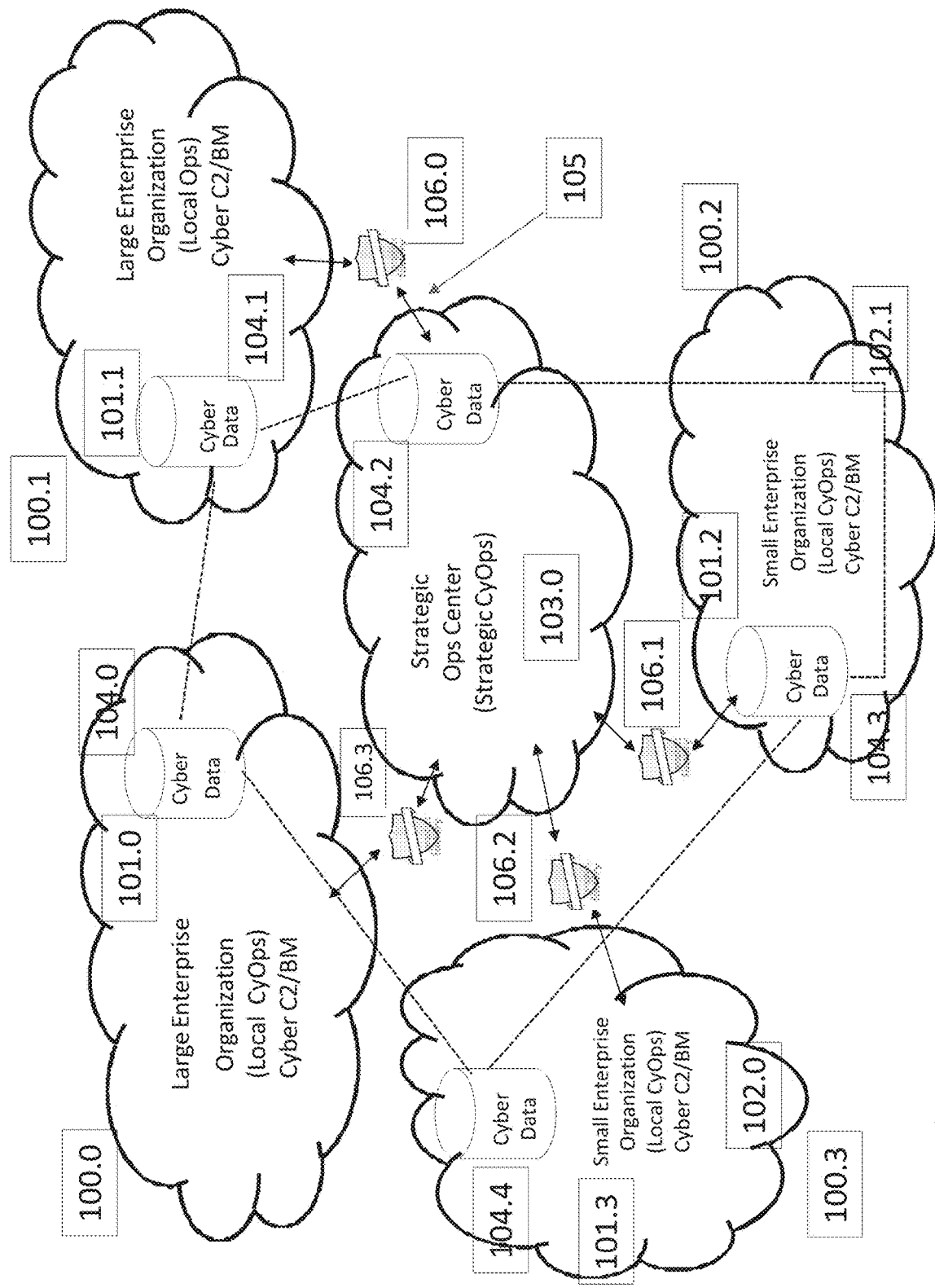
FIG. 1 is an example of a globally distributed deployment model and is useful for understand the global expanse and distributed C2/BM mission integration of the invention—cloud or non-cloud implementation.

The invention is described with reference to the attached figures. The figures are not drawn to scale and they are provided merely to illustrate an instance of the invention. Several aspects of the invention are described below with reference to example applications for illustration. It should be understood that numerous specific details, relationships, configurations and methods are set forth to provide a full understanding of the invention. However, the dynamics and adaptability of the invention are virtually unlimited; i.e., the invention adapts to a given situation at any given moment in time and space. The invention adaptively tunes it architecture (operational and system/software) in near real-time to optimize mission outcomes and effects. This invention covers all possible dynamic and adaptable command and control and battle management configurations possible with the architecture. Further, the invention provides a system/SoSs software framework to integrate new capabilities and methods at all architectural levels; i.e., applications and infrastructure levels. This is typically done applying agile software integration and development methods to rapidly address new requirements (e.g., emerging cyber threats.

This invention covers other and all applications for which it has applicability. Examples include, but are not limited to, business, virtual organizations that implements a business entity or other organizational forms and kinetic C2/BM of kinetic (physical) warfare operations, and computer or otherwise automated games and educational instruction using the architecture. The invention includes implementations that do not include the use of virtual technologies, a combination of virtual and non-virtual technologies and all non-virtual technologies. The architecture can be implemented with tradition organizations (i.e., without the use of the VO). The invention also includes all architectural patterns; e.g., client-server, centralized, distributed; e.g., peer-to-peer (P2P), peer processing architectures and any combination that can be employed to implement the invention. The knowledgeable and/or ordinary practitioner will recognize the invention can be implemented with one or more of the methods and architectural patterns, operational architectural patterns or system/SoSs patterns. In other instances of the architectural patterns (operational or system/software) are not shown in detail to avoid obscuring the invention. The invention is not limited by the illustrated ordering of events, processes or configurations as some events may occur in different orders and/or concurrently with other configurations or events. Furthermore, not all illustrated configurations or events are required to implement a methodology in accordance with the invention.

It should also be understood that the concepts (e.g., CyberOps Chain) and terminology used herein are for the purpose of describing particular embodiments, characteristics and properties of the system or SoSs and is not intended to be limiting of the invention as described above. The terms "CyberOps Chain", "Kill Chain" and "Cyber Operations Analytical Framework" refer to the same processes, but have different context based on the current discussion (e.g., kill chain is used when the discussion refers to kinetic vice cyber operations). The Cyber Operations Analytical Framework terminology is used when the intent is to emphasize the analytical properties of the chains.

As used herein, the singular forms "a", "an" and "the" can be intended to include the plural forms as well, unless the context clearly indicates otherwise. Furthermore, to the extent that the terms "including", "includes", "having", "has", "with", or other variants thereof are used in either the detailed description and/or the claims, such terms are intended to be inclusive in a manner similar to the term "comprising."

Further, unless otherwise defined, all terms (including, but not limited to: technical, engineering, scientific, operational, system, SoSs, business, and military terms) used herein have the same meaning as commonly understood by one of ordinary skill in the practice to which this invention belongs. It will be further understood that terms, such as those defined in commonly used dictionaries and acronym lists, should be interpreted as having a meaning that is consistent with their meaning in the context of the relevant practice and will not be interpreted in an idealized or overly formal sense unless expressly so defined herein.

Referring to FIG. 1, there is shown a diagram of an exemplary single instantiation of 1: Many distributed Clouds (or cloud-like architecture) 100s which represent the integration of federated enterprise Clouds 100s. Each 100s (100.0-100.3 is employing computing software patterns and computing hardware instantiated as a Cyber C2/BM system/SoSs supporting local large enterprise organization 101.0 and 101.1 or smaller 102.0 and 102.1 organizations conducting local Cyberspace operations with 101s. 103 illustrate the highest level of cyber command or management within the defined larger enterprise. Its organizational form and C2/BM configurations are the same as 101s and 102s, with the unique role of overall command or management of the enterprise. It is important to note, the dynamic and adaptability of the command or management Cloud can be assumed by any 101s or 102s on demand. This is typically determined by the nature of the threat and operational rules of engagement, priorities, and command or management protocol. Distributed shared or global data spaces 104.0-104.4 resides at all 101s, 102s and 103 in the enterprise. The date contained in those 104s is tailored to the local mission, but can be accessed by other members of the federation with appropriate authority and permissions. This is generally coordinated access permission with all stakeholders and commander or management. The 104 data spaces are typically implemented with the relational database model embodying all is properties, functionally and design features as determined by specific implementation. In a cyberspace C2/BM operations instantiation, the data includes but is not limited to intrusion detection data, logs, and firewall data and so on. Employing the inventions as a cyber-physical framework implementation, the global data spaces can include similar data from kinetic (physical) world operations. Data sources from cyber and physical can be fused to create cyber-physical situational awareness. The 104 data spaces can also be implemented with other database models (e.g., object oriented database).

The 105 in FIG. 1 illustrate the communications channels as an example (all are not illustrated in FIG. 1) and links creating the federation of the enterprise organizations and the Cyber C2/BM SoSs integration. The invention is primarily concerned with the middleware and applications layers and its architectural description as part of the larger Cyber C2/BM System/SoSs software framework. This will be discussed later herein. These communications channels can utilize virtual private networks (VPNs) with a vast host of typical network protocols and technology; e.g., TCP/IP, wireless, satellite.

The invention generally concerns a method for communicating data in a computer network (e.g., in computer network 105 in FIG. 1). Data is transmitted from a one computing device (physical or virtual machine) to a second computing device. Computing devices within the network are represented with multiple identity parameters. The phrase "identity parameters" as used herein can include items such as an Internet protocol (IP) address, media access control (MAC) address, ports, and application program interfaces (APIs) and so on. However, the invention is not limited in this regard, and identity parameters can also include a variety of other information which is useful for characterizing a network node; e.g., a wireless node—cell phone. The various types of identity parameters contemplated herein include both physical and logical (e.g., virtual machine) and will be discussed later as they apply to the implementation and in particular, the dynamic and adaptability of the invention.

The 106.0-106.4 in FIG. 1 illustrate the suite of security controls applied across the enterprise layers of the Open System Interconnect (OSI) Model or it variants. The diagram does not illustrate all layers of security controls or their placement in the architecture. It is assumed security practitioners will architect the security architecture per their organizations security policies, therefore the complete set of controls are not illustrated. The controls are typically cited from the National Institute of Standards (NIST) 800-53 guidance. It is beyond the scope of this invention description, nor is it practical to cite specific security controls, as they are specific and will be selected per the particular organizations' cyber security policies. The invention is designed to accommodate the implementation of security controls employing the typical defense-in-depth strategy, but extends the management of cyber security controls dynamically by employing a repeatable analytical framework for cyber security measurement of system and SoSs resiliency and other cyber effects. This will be explained later herein.

Figure 2:
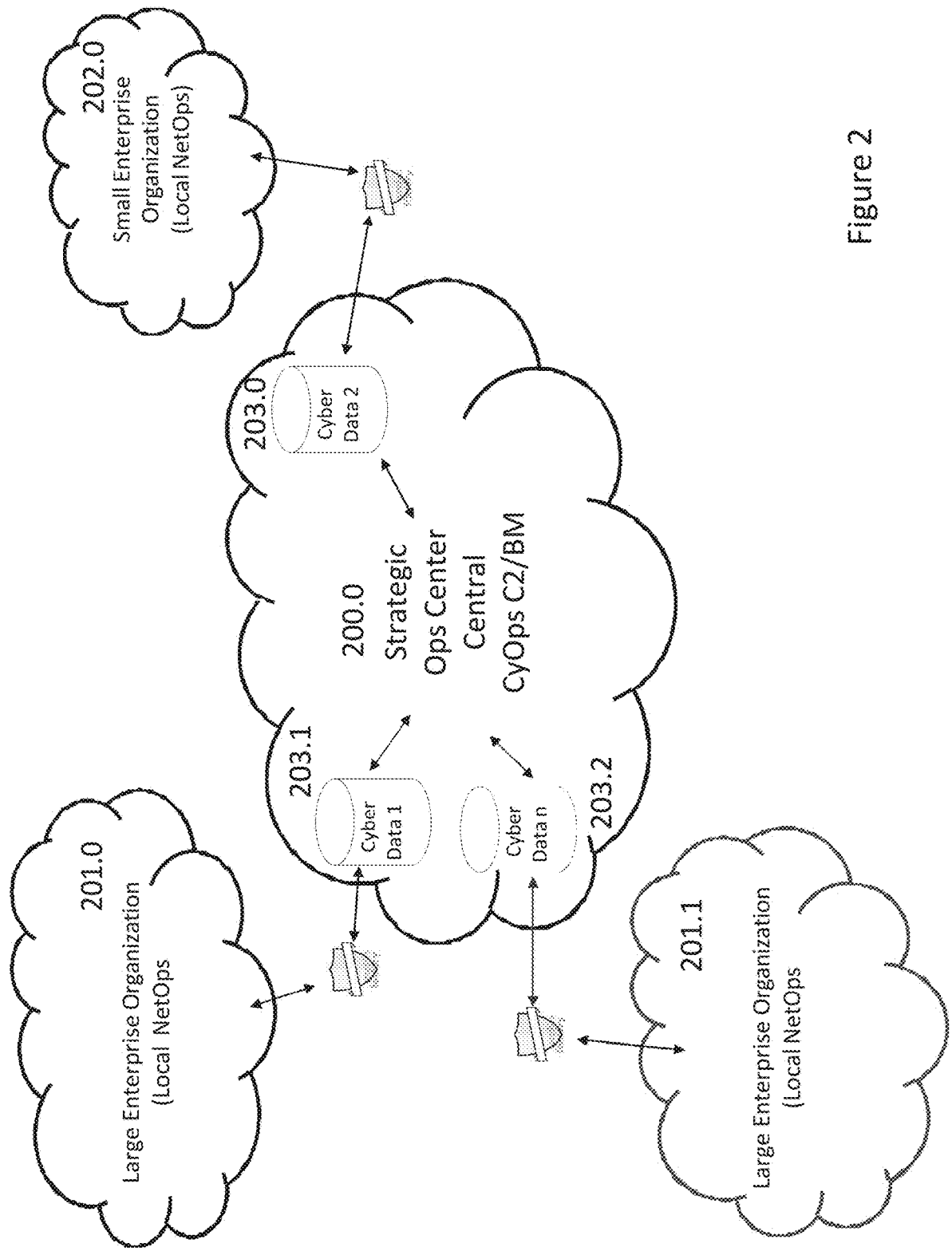
FIG. 2 is an example of the invention when deployed as a globally centralized operations deployment model and is useful for understanding a centralized C2 deployment approach of the invention—cloud or non-cloud implementation.

The configuration in FIG. 2 illustrates a centralized system and operational model for the invention. The Configuration in FIG. 2 shows 200 as a centralized Cloud and overall commander or manager. Organizationally, 201.0 and 201.1 are major organizations and smaller organizations (e.g., a military base or regional office) at 202.0. This is consistent with FIG. 1 with regard to organizations in the distributed operational architecture. The other technologies and architectural patterns follow from FIG. 1 and the implementer has options; e.g., employing request-reply messaging vs. publish and subscribe messaging.

However, in this configuration all enterprise data is sent to the centralized databases at 203.0-203.2 and the large and smaller organizations access the centralized Cloud from their regional sites or geographical locations. FIG. 2 represents an alternative C2 form that can be implemented with the invention. In this form, there is only one instantiation of the Cyber C2/BM system (i.e., the invention). This implementation is well understood by the community of practice as client-server architecture, whereas FIG. 1 implements a P2P or peer-processing architecture. A peer-processing architecture is a special case of P2P in that all systems (i.e., computer platforms) are all running identical versions of all software; e.g., the Cyber C2/BM system are all the same version. The invention can instantiate dynamically any and all C2 (e.g., P2P, peer processing and client server) forms simultaneously across and enterprise and still operate as a federated system/SoSs. The execution of these dynamics is an example of "tuning" the architecture to optimize the operational and system architecture for maximum performance and effects enabled by the right C2 form for the mission at hand. This dynamic of tuning the architecture "on demand" can then serve to inform measure of performance (MOPs) and measure of effectiveness (MOEs) analysis. Examples of how this is done with be discussed later, herein. Other identity parameter follow from FIG. 1.

Figure 3:
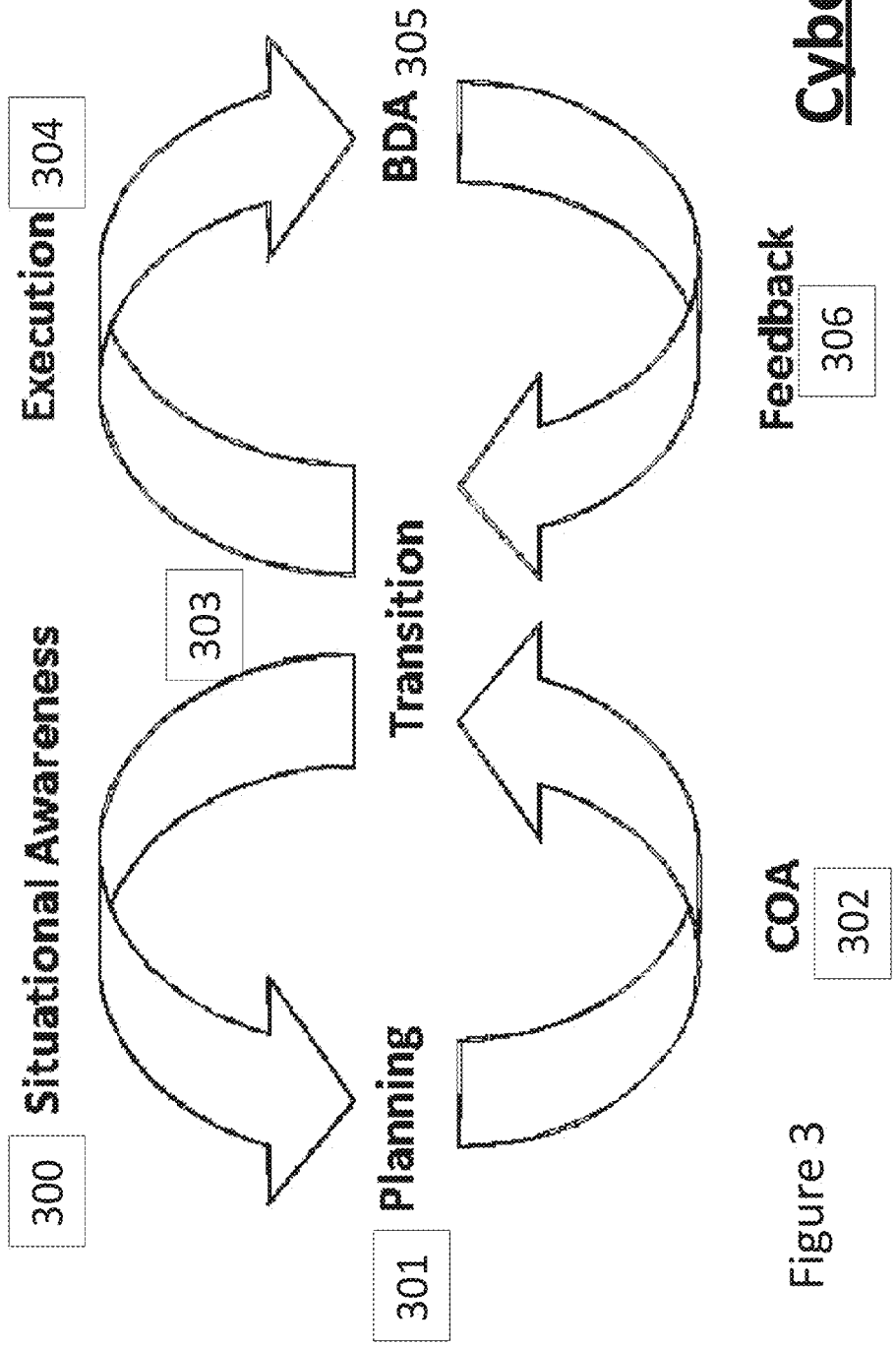
FIG. 3 describes the cyber operation chain (aka CyberOps Chain); i.e., the analytical framework by which all cyberspace operations are processed and is useful for understanding the analytical processes of cyber command and control battle management.

FIG. 3 illustrates the analytical processes of processing a Cyber C2/BM mission. It should be recognized by practitioners of military command as the "kill chain" and those familiar with cybernetics information and control theory. Or more specifically, the kill chain, a special case of the information value chain. For the purpose of this invention it is called the CyberOps Chain to be consistent with the discussion herein. The CyberOps Chain is implemented with two interlocking operational cycles. The first is the C2 cycle, defined as the following process: CyberOps Command and Control (C2) cycle are the activities of a Cyber commander in planning, directing, coordinating, and controlling forces in the accomplishment of the mission. The resources include personnel, equipment, communications, facilities, and procedures. The functions performed in the C2 process are situational awareness (SA) generation, planning, and course of action development (COA) development. The invention provides the software framework to insert SA, planning and COA selection applications using a traditional or agile develop approach. Software architecture interfaces (i.e., APIs) to facilitate this integration will be discussed later herein.

The CyberOps Chain is two (i.e., C2 and BM) integrated and continuous near real-time cycles, occurring to manage cyberspace operations across the cyber operational domain. FIG. 3, 300 shows the situational awareness (SA) step in the CyberOps chain. It employs framework integrated software applications receiving cyber data (e.g., intelligence data, cyber sensor data) from multi-source cyber sensors and other intelligence sources to fuse, analyze and present information to commanders and planners facilitating course of action development. In the cyber battlespace SA includes local, shared, and global level SA pictures. The invention provides up-to-the-minute SA for each of these levels is essential, especially in light of the technological sophistication and situational complexity of the threats. The architectural patterns employed in the framework invention to implement these high performance requirements will be defined later herein.

FIG. 3, 301 illustrates Cyber C2 planning. The framework employs integrated software applications to facilitate deliberate or dynamic real-time planning. Cyber-attack operations often have to be deliberate, whereas defense planning often has to be dynamic and near real-time. Deliberate offensive planning requires exquisite detail on the target infrastructure in terms of hardware, connectivity, software, interfaces and particular configurations, protocols, etc. Defensive planning requires time critical SA and near real-time dynamic adaptive planning.

FIG. 3, 302 C2 Course of Action (COA) development and selection. The framework employs integrated software applications to facilitate near real-time COA selection decision support. The process involves the commander and staff development and evaluation of a list of important governing factors to form courses of action (COAs), consideration of each COA advantage and disadvantage, identify actions to overcome the disadvantages, make final tests for feasibility and acceptability and weigh the relative merits of each. This step ends with the commander selecting a specific COA for further CONOPS development or mission execution.

FIG. 3, 304 Battle Management Execution (BME) occurs once the commander has selected the COA, orders are given to the cyber forces that will execute the COA. The C2/BM software framework provides the interface to implement and manage execution of COA selected capabilities as an integral part of the CyberOps Chain processes. COAs apply to defensive, offensive and exploitation actions or a combination of all three, depending of the nature of the cyber engagement. COAs may include coordination and collaboration with other DoD and/or national stakeholders, depending on the operational scope of the cyber engagement.

FIG. 3, 305 Battle Damage Assessment (BDA) and Feedback Loops occurs after the COA has been complete, the commander desires an assessment of its outcomes/effects, referred to as battle damage assessment (BDA). However, information gathering perspective, BDA is typically conducted with sensors and other techniques. In the conduct of cyber warfare it must be done in near real-time. Results of the BDA are fed back into the SA picture via their respective feedback loops, illustrated at 306.

Figure 4:
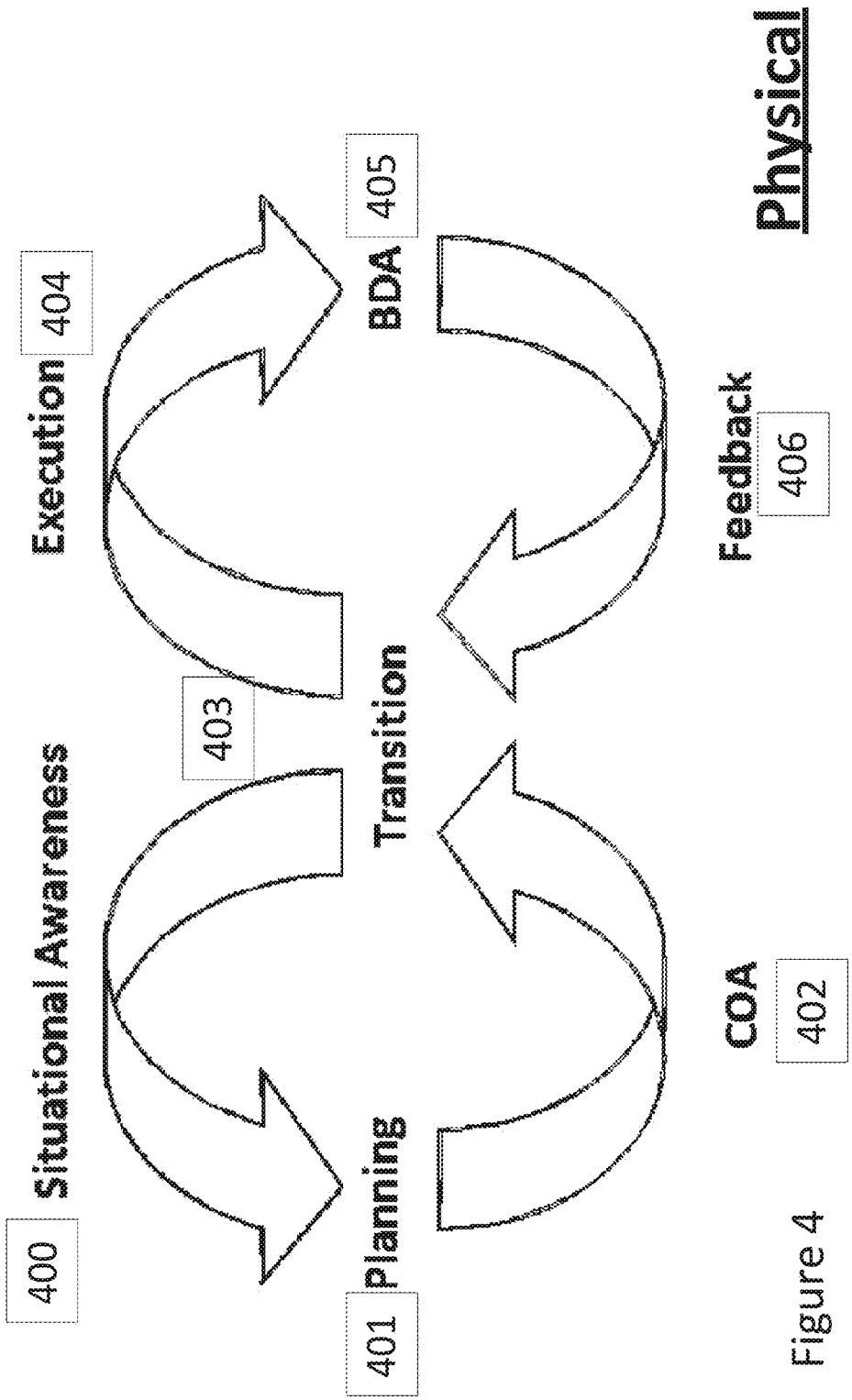
FIG. 4 describes the physical operation chain (aka CyberOps Chain); i.e., the analytical framework by which all physical (kinetic) operations are processed and is useful for understanding the analytical processes of physical-world command and control battle management.

As in all phases of the CyberOps Chain, the framework provides architectural extensibility for new functional capability and applications (e.g., SA applications) integration. This extensibility applies to all phases of the CyberOps chain for the purpose of rapidly integrating new capability through an agile integration processes with API modifications or new design and development. This "operational engineering and acquisition" is an inherent part of the invention because the framework itself was designed to accommodate rapid acquisition needs of the cyberspace operational environment (e.g., the invention includes an engineering cell and operational test bed). In FIG. 4 the analytical framework is illustrated for kinetic operations. While FIG. 4 is identical in phases, it's presented here because the invention has the capability to integrate cyber operations with kinetic operations (i.e., cyber-physical systems) and this idea of two distinct cyber and physical chains executing in parallel and integrated needs to be clear to understand the full system/SoSs scope (i.e. the chains are distinct in their operational domains, while essentially the same in their phase of execution) of the invention. Further, the integration and synchronization of the two operationally and as system/SoSs perspective is a capability of the invention (e.g., tuning the operational and system/SoSs architecture) will be discussed later herein.

Figure 5:
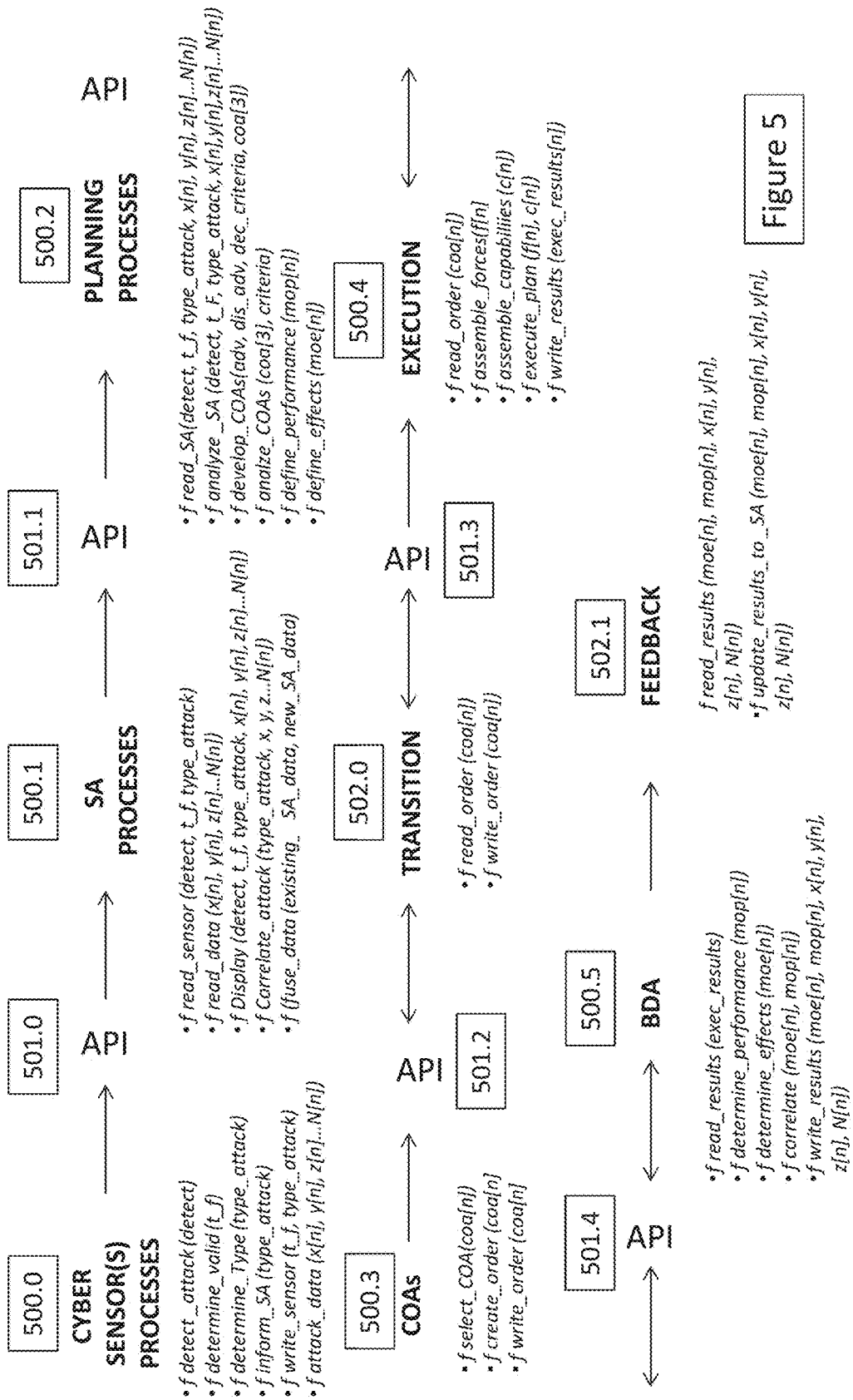
FIG. 5 is a data flow diagram illustrating representative example C2/BM software functions and APIs implementing each phase of FIG. 3 the CyberOps Chain. It is useful for understanding a representative set of APIs that link software implementation of the CyberOps chain phases. I similar set of function apply to FIG. 4, but apply to kinetic operations.

FIG. 5 illustrates the do data flow and software process of the CyberOps chain. Application program interfaces at 501.0-501.4 illustrate linking each application suite 500.0-500.5 with each phase of the chain. A representative set of software functions definition illustrated are also identified at 500.0-500.5. At 502.0 and 502.1 transition from C2 to BM and feedback loops to update situational awareness (SA) are illustrated, respectively.

Figure 6:
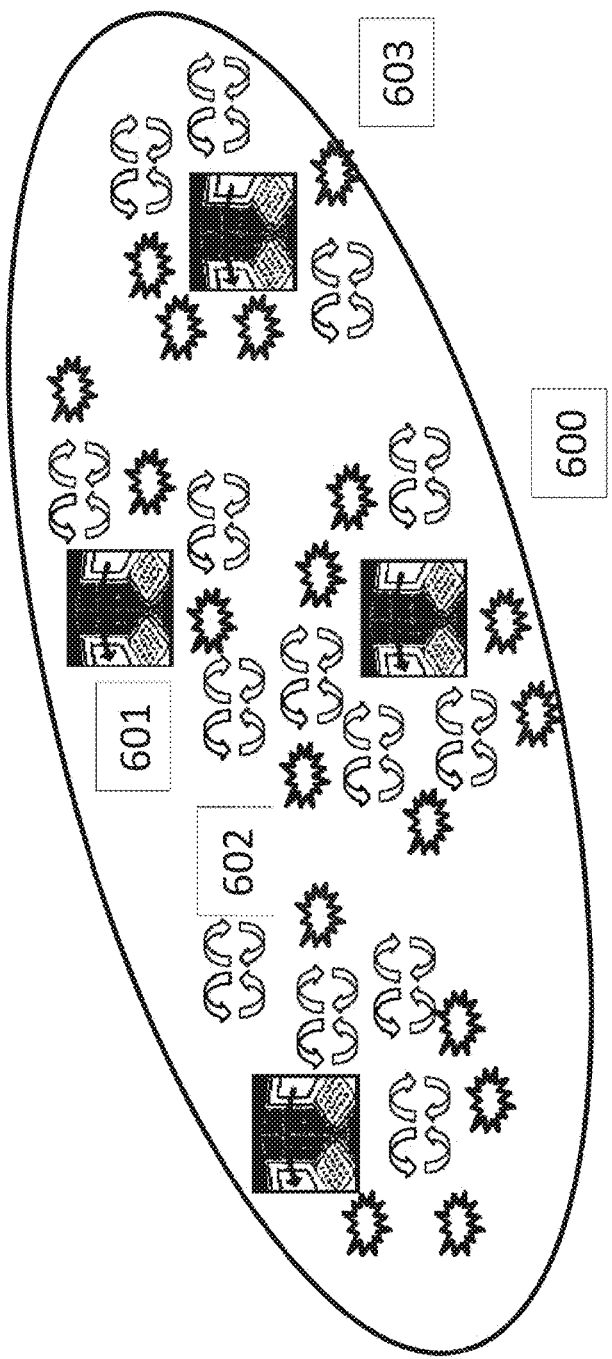
FIG. 6 is an example of the Cyber C2/BM suites being deployed across a regional or global enterprise and managing attacks with the CyberOps Chain. The diagram is useful for the discussion of Cyber C2/BM systems deployed as distributed peer-to-peer and federated or any combinations of deployment strategies.

In FIG. 6 the multiple Cyber C2/BM software suites, 601 are deployed across an enterprise or cyber battle space, 600 in a federated, peer-processing operational architectural; federated system/SoSs configuration. Each Cyber C2/BM system, 601 is managing 100s to 1000s of cyber incidents or attacks, illustrated at 603 by employing the CyberOps Chain analytical framework, 602 processing in near real-time, 300-306 CyberOps Chain phases. Each instance of 602 is prioritized per mission needs, severity of attack, and risks. If incidents or attacks affect multiple 601s, Cyber C2/BM suites, the federated system or SoSs shares information, coordinates and synchronizes responses to the benefit of the overall enterprise.

Figure 7:
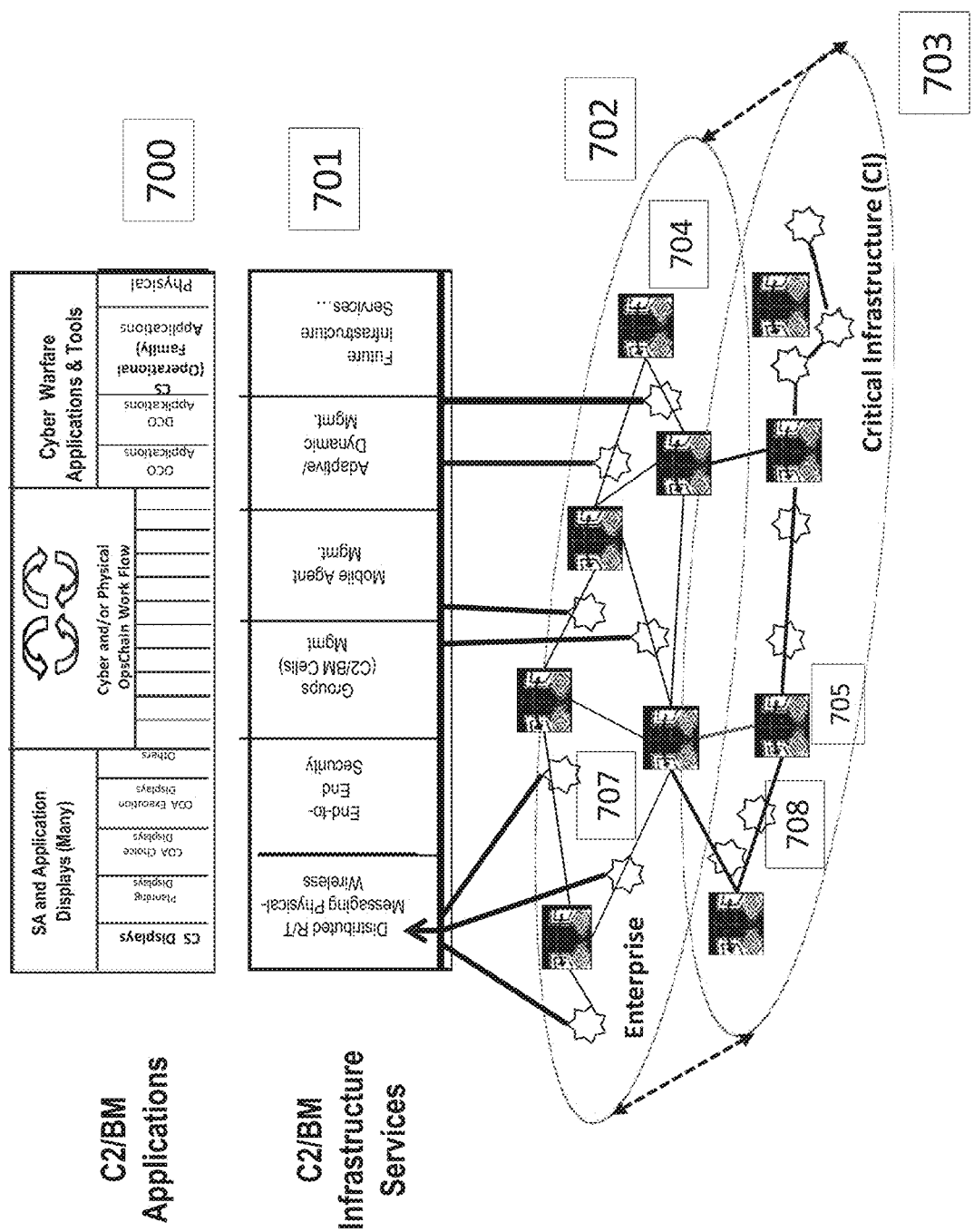
FIG. 7 is a "first order" diagram of the Cyber C2/BM system (or system-of systems) and its architectural layer designations integrating an enterprise (i.e., Joint information Environment (JIE)/Global Information Grid (GIG). It is useful for understand the functions of the layered architecture and the SoSs perspective.

The Cyber C2/BM system architecture FIG. 7 is illustrated with a SoSs deployment model inclusive of an enterprise (e.g., military global cyberspace operational environment), 702 integrates with national critical infrastructure enterprise, 703. Diagram elements 704 identifies all the Cyber C2/BM federated system suites in the enterprise; 705 illustrates the C2/BM suites in the critical infrastructure. Together, 607 and 608 show federated configuration as a 1:M relationship of singular, federates C2/BM systems managing many security controls via APIs to security control. At critical infrastructure 703, C2/BM system suites 704s are illustrated as federated cyberspace operations missions with the enterprise 702 C2/BM suites, 705s. This facilitates near real-time coordination and synchronization of all national cyber capabilities and forces to protect critical infrastructure, national security systems (e.g., military networks) and can extend to state and local as well as globally to allies and coalition partners. Military forces cannot conduct effectively military operations without the support of national critical infrastructure. The Cyber C2/BM software suites, 705s manage CyberOps Chains (described in FIG. 3) executing the analytical framework phases, 300-306 with the Cyber C2/BM software suites 704s deployed as a peer processing or P2P SoSs federated architecture. The solid lines between the C2/BM suites are network links (e.g., TCP/IP networks, satellite, etc.).

In FIG. 7, the workflow CyberOps C2/BM analytical framework application suite level of the system architecture, 700 is described. The Cyber C2/BM system integrates and manages all Cyberspace operations' capabilities and tools (i.e., applications). These tools and capabilities include, cyber security controls as defined in NIST 800-53 guidance, offensive cyberspace operations tools and capabilities, defensive cyberspace operations tools and capabilities and cyber intelligence tools and capabilities. Through the Cyber C2 cycle of the analytical framework, FIG. 3, phases 300, 301, and 302 cyber planners and commanders or cyber security managers in the civilian sector, can mix and match different capabilities and tools in near real-time to tailor and tune the overall Cyber C2/BM architecture to the specific mission execution needs, FIG. 3, 304. This architectural tuning also includes selection of forces and/or security personnel to maximize skills to the specific threat and tailored data to support the mission. This the mechanics and software patterns of the invention's architecture to facilitate "fine tuning" for optimal performance and effects will be described later herein.

One of the cyber capabilities the invention manages is cyber security controls. In FIG. 7, 700 cyber security controls are called out as one of the capabilities. This will serve as an example of how the invention employs the CyberOps Chain analytical framework to manage cyber security in near real-time. This is a single capability example to illustrate the analytical framework process applied to a NIST 800-53 security control. The mixing and matching of other cyber security controls and other cyber mission capabilities requires system/SoSs and operational architecture integration. The architecture patterns, (operational and system) to achieve this will be described later herein. FIG. 26, 2602.0 references NIST 800-53 intrusion response (IR) controls IR1-IR10. The left side of the diagram, 2601.1-2601.4 illustrates the phases of the CyberOps Chain analytical framework. The general process of employing the phase of NIST 800-53 IR controls can be mapped to the phases of the CyberOps analytical framework as illustrated with the mapping of 2601.1-2601.4 to 2602.1-2602.4 in FIG. 26.

Figure 9:
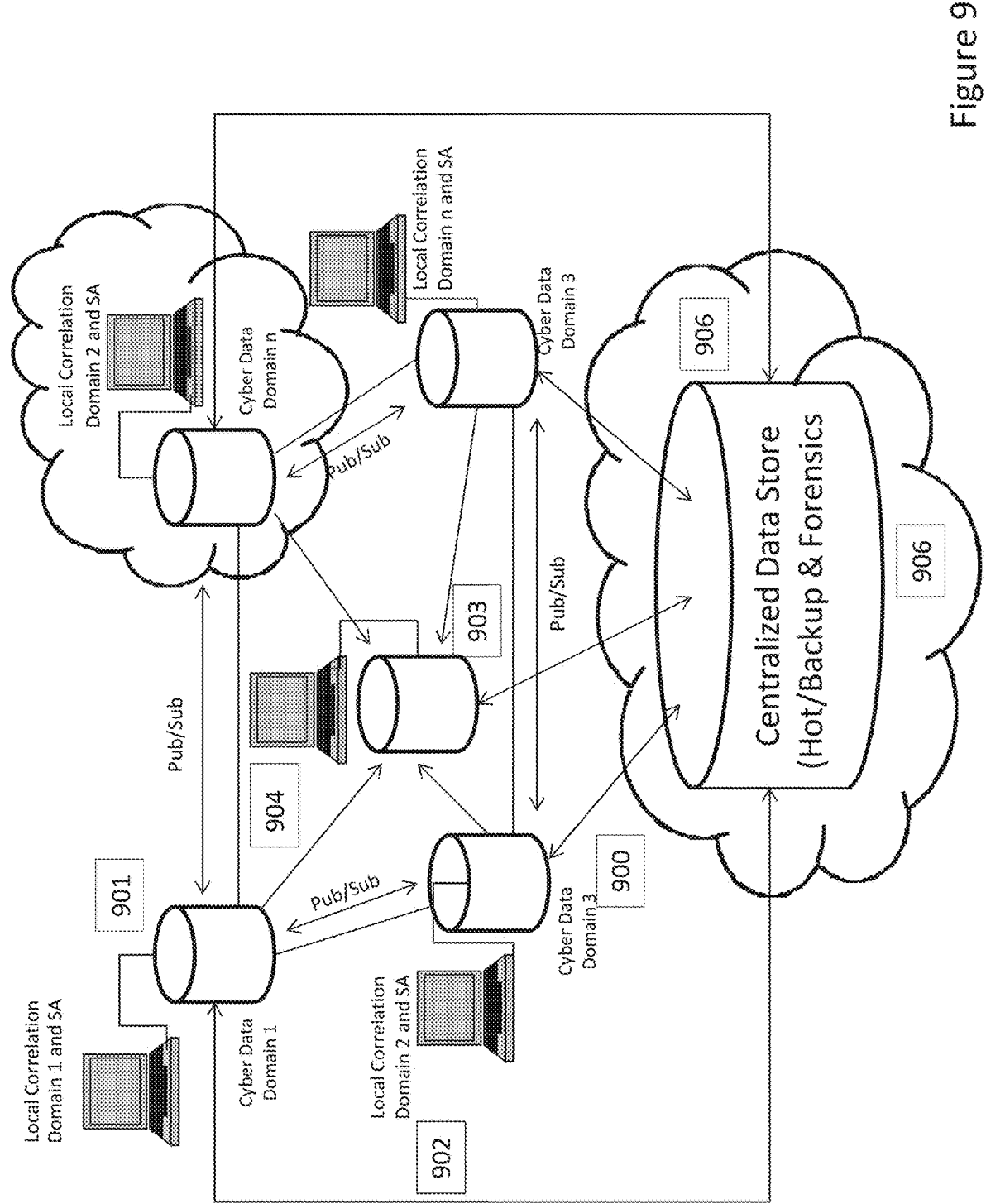
FIG. 9 illustrates multiple deployed C2/BM systems with local shared data space and local situational awareness. Each local C2/BM suites is publishing a summary of their local SA and its being fused into the global or enterprise SA. This diagram is useful for understand the peer-processing concept and virtual shared dataspaces.

The implementation of this capability in the invention utilizes the publish and subscribe distributed R/T service in the C2/BM infrastructure service layer, 701 to publish cyber intrusion sensor data to SA database, i.e., virtual or shared data spaces, FIG. 9, 901 applications, FIG. 7, 700 as described in the architecture for processing and display of SA. The CyberOps analytical process is executed through all phases, FIG. 3, 300-306; the interlocking cycles; i.e., C2 and BM repeat until the intrusion response mission is complete.

Figure 8:
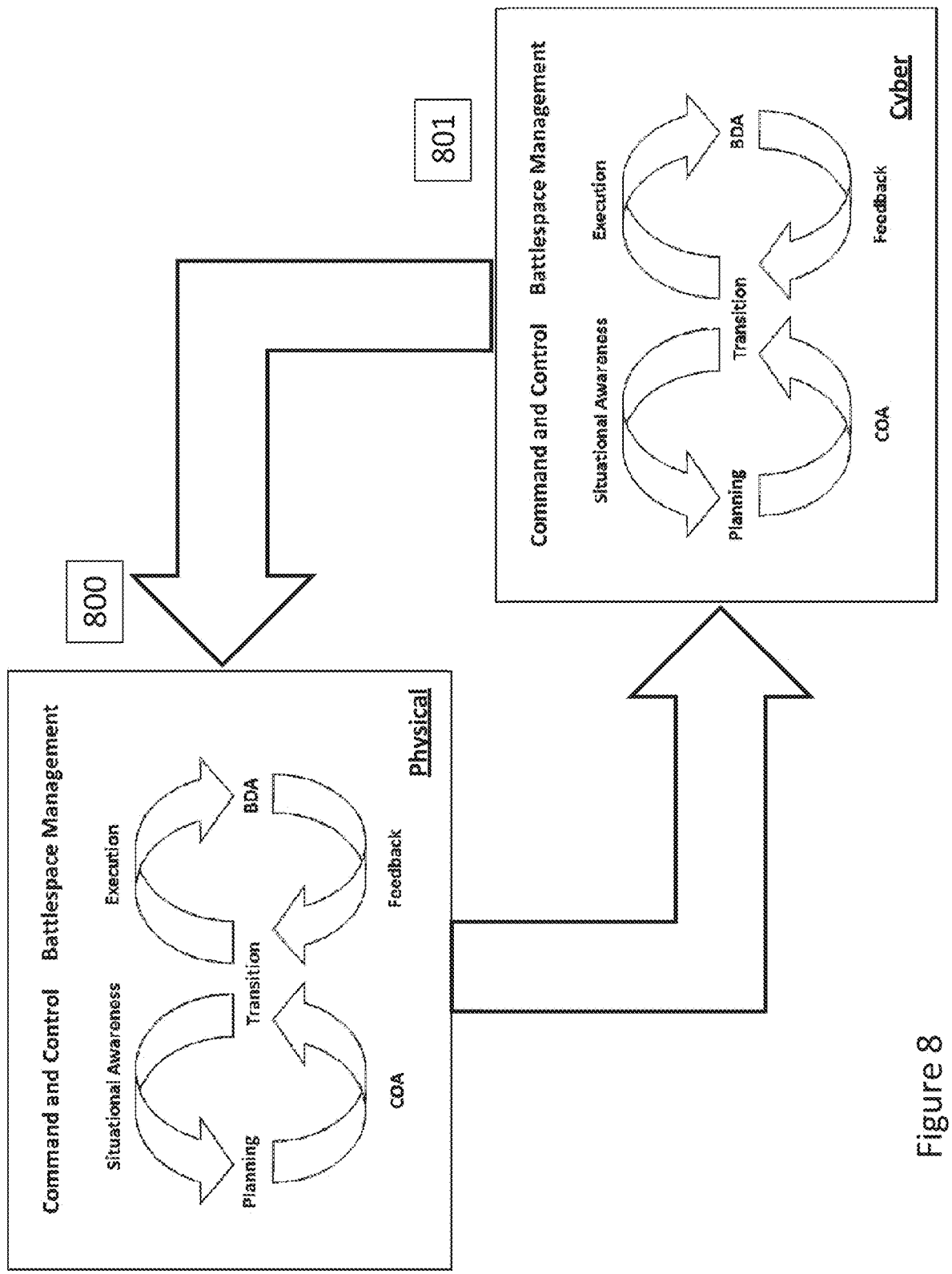
FIG. 8 is a cyber-physical kinetic (kinetic) operations chain; i.e., the analytical framework by which kinetic operations are processed. The double pointed arrow is useful and describes the integration and analytics that occurs when kinetic and cyber operations occur simultaneously—the chain only differ in the domain data they processes—it is this that facilitates ease of integration across the domains.

The invention provides the software framework to integrate cyber and kinetic (cyber-physical operations). In FIGS. 8, 800 and 801 illustrate a conceptual congruence between the C2/BM analytical framework cycles. This invention's conceptual Cyber C2/BM analytical framework congruence is introduced here to illustrate the integration of cyber-physical conveyed in FIG. 7, 700 applications for kinetic operations, 707 and 707; i.e., critical infrastructure physical systems; e.g., power grid Later, herein formal cyber-physical integrated C2 structures definitions will be provided in the context of a cyber-physical SoSs integration of missile defense and cyberspace operations.

The invention's provides a distributed near real-time architecture that simultaneously conducts C2/BM analytical framework processing at local sites FIG. 9 as well as a central site. FIG. 9 provides an architectural artifact conveying one configuration of how the invention implements capability. In FIG. 9, 900 is reprehensive local correlation for local SA. This is the same at the three other CND domains, 1-n, which typically are global regions of an enterprise or areas of responsibility (AORs) for military operations. The cylinders at each domain are local shared data spaces, FIG. 1, 104 and FIG. 9, 901 and again, exist it each local domain. As illustrated, its data is supports Cyber SA. The lines, 904 illustrate the logical relationship of the virtual shared data stores. The double tip arrow lines illustrate the capability to publish and subscribe to all domains' data. This is typically done when cyber-attacks or events are occurring at 1-n domains. This capability can be done dynamically; "on demand" in near real-time and its typical utilization is determined by emerging cyber threats and attacks. All possible combinations, 1-n of publishing and subscribing across domains are possible and implemented by the invention.

The centralized cylinder in the middle of FIG. 9 represents the military commander's or cyber security manager's global SA virtual shared data store, 903. Again, SA data is illustrated, but this data store also contains other cyber information and can contain fused data from all sources, which informs the commander or cyber security manager of an integrated enterprise SA picture—this data store state represents the typical implementation of the invention. As the overall cyber commander or cyber security manager the domains 1-n send summaries of their near real-time Cyber SA, where SA application software at 803 integrates the local SA to achieve a strategic picture of the enterprise.

The cloud and cylinder at the bottom of the diagram, 905 and 906 is a centralized data store employing cloud technology. Note, this does not have to utilize Cloud technology. Any enterprise database management system (DBMS) can serve the purpose. This data store subscribes to all data across the enterprise and serves as a hot backup and support forensic analysis. Update publications from the operational domains occur when new domain data appears in the local databases, but update frequencies can be adjusted per operational needs.

Referring to FIG. 9, in certain embodiments, the present invention may include the following: RED Cylinder (data store) represents centralized operational data store—this is typically associated with the commander/HQs and has summaries from each domain to support HQs real-time (R/T) situational awareness, planning and so on. GREEN Cylinders (data stores) represent local data supporting the local domain R/T operation. BLUE Cylinder is a centralized (Master) data store with ALL data from the enterprise; e.g., JIE/GIG; serves as hot/backup and forensics analysis. Each domain, HQs and de-centralized data stores can be implemented with Cloud technology (illustrated with central data store and Domain N) or with traditional IT. ORANGE Lines: local data sent to Master data store. BLACK Lines: Communications Links. RED Lines: Illustrates typical Publish and Subscribe direction(s); note these can dynamically change per R/T operational/information needs. Screen icons represent SA pictures. Local for Domains. Global for HQ/Commander.

Figure 10:
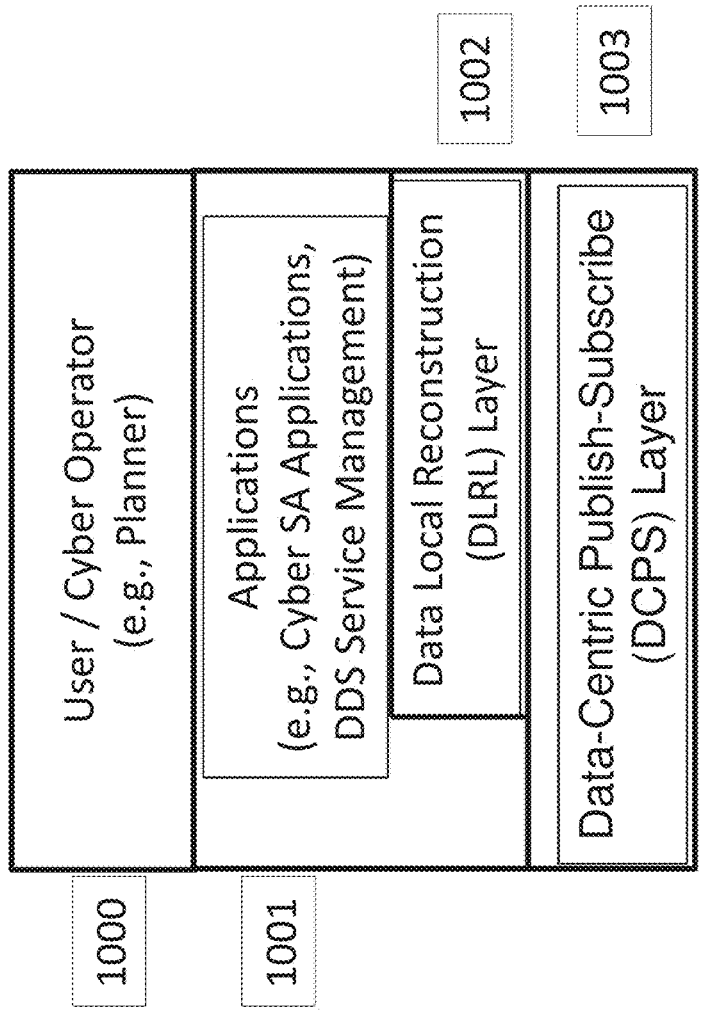
FIG. 10 illustrates the layered hierarchy of the Data Distribution Service (DDS). It is useful as a reference for the inventions architecture discussion herein.

The invention employs the Object Management Group's Data Distribution Services (DDS) specification standard. Currently, the invention is built with the OpenSplice, RTI, and Twin Oak's versions of DDS. FIG. 10 describes the software layers of DDS and is representative of how DDS is used in the invention. The lower layer DCPS APIs 1003 are used to exchange application data (e.g., based data topics) with other DDS-enabled applications according to policies requirements. An example of a topic one would subscribe to might be "intrusion data." Publisher and subscribers can dynamically change topics (or other Pub/Sub criteria, e.g., content, subject) to tailor to their time critical data requirements and as operational needs dictate. The upper DLRL layer APIs 1002 define how to build a local object (data) cache so applications (Users) can access topic data as if they are local. Users interface with C2/BM applications FIG. 7, 700 to conduct their specific missions; e.g. use cyber defense applications. The invention's architecture employs C2/BM cells (virtual or physical) related to the mission they are performing (e.g., Cyber Protection Team Cell). Cells have highly tailored data to maximize operational performance and effects and minimize queries to data at another physical location—In FIG. 9; e.g., 901 local data store. The invention's operational cell architecture will be defined later, herein. DDS service applications 901 enable manage of DDS services for a Cell (e.g. subscribing to tailor data for a specific task or mission). The user or cyber operator is illustrated at 900 and they interface applications through graphical user interfaces (GUI) and virtual presence (e.g., virtual presence in an operational C2/BM virtual cell).

Referring to FIG. 10, in certain embodiments, the present invention may include the following: The lower layer DCPS APIs applications use to exchange data (e.g., topics) with other DDS-enabled applications according to policies requirements; these can dynamically change as operational needs dictate. The upper DLRL layer APIs define how to build a local object (data) cache so applications (Users) can access topic data as local. Users interface with applications to conduct their specific missions. In our architecture user reside in cells (virtual or physical) related to the mission they are performing (e.g., Cyber Protection Team). Cells have highly tailored data to maximize operational speed and effects. DDS Service Applications will manage DDS service for a Cell (e.g. tailor data)

Figure 11:
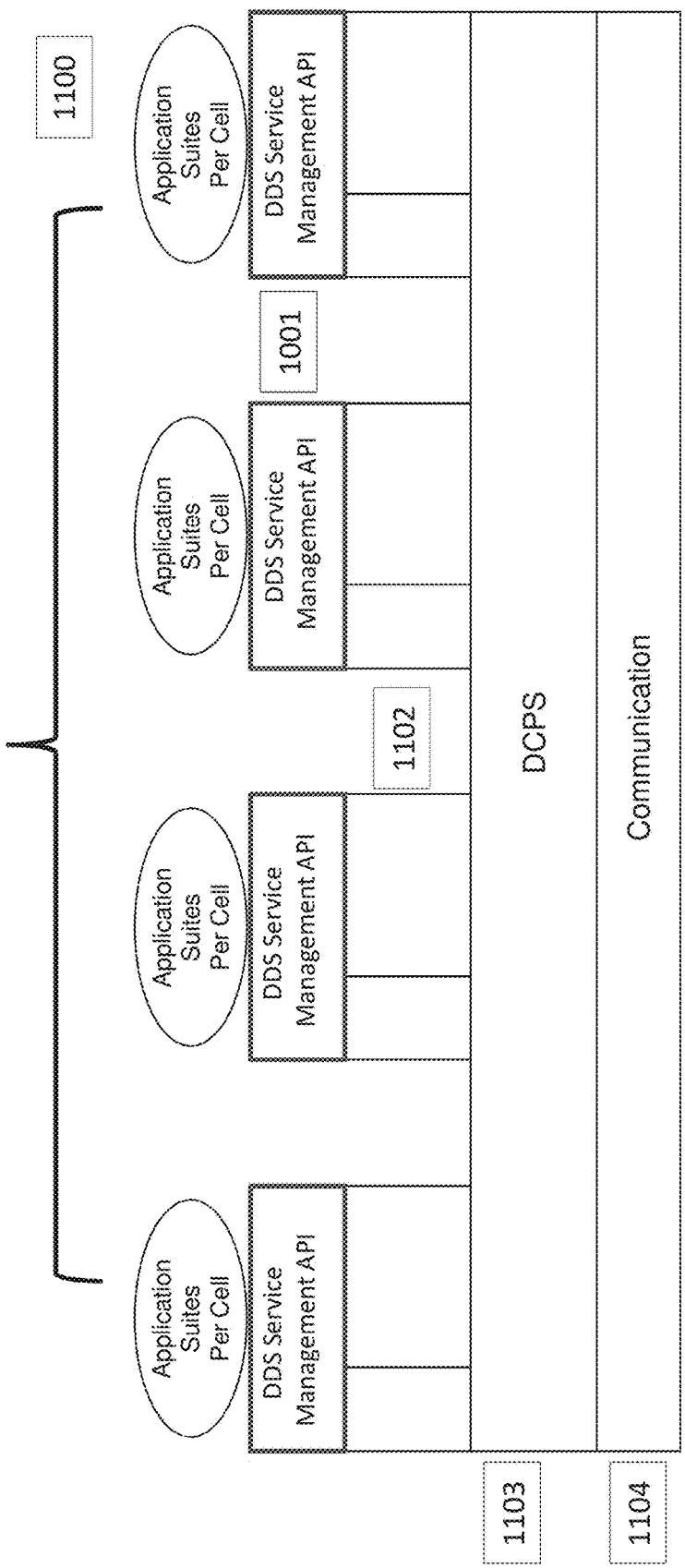
FIG. 11 illustrates how DDS supports the applications and operational cells of the invention. It is useful as a reference for the inventions architecture discussion herein.

FIG. 11 illustrates Cyber C2/BM application architectural relationships with DDS and how it is organized in the invention; i.e., it illustrates how the Cyber C2/BM applications FIG. 7, 100 interface and interact through APIs with DDS middleware. In FIG. 11, 1100 is illustrated the application suite (referred to as the cell's "tool box" of tools and capabilities for each cyber C2/BM cell. Each tool box application utilizes the DDS service though its tailored DDS Service API to communicate with sensor applications and nets and other Cyber C2/BM cell applications; (e.g. Cyber SA, Planning and so on), FIG. 7, layer 700. Layer 1101, 1102, and 1103 follow from the description associated with FIG. 10. Layer 1104 is the communications model which is a message oriented publish—subscribe data distribution. Other models for how applications interact, such as remote method invocation, message oriented, queue based, replicated data and distributed transaction are inclusive of the invention, but publish-subscribe message data-distribution is used because subsystems are decoupled in time, space and synchronization. It supports a variety of transports (e.g., UDP) and it is better suited for high-performance real-time systems/SoSs. Other communication models might have utility under certain circumstances, for example, one deliberately wanted to force synchronous invocation for timing purposes.

Figure 12:
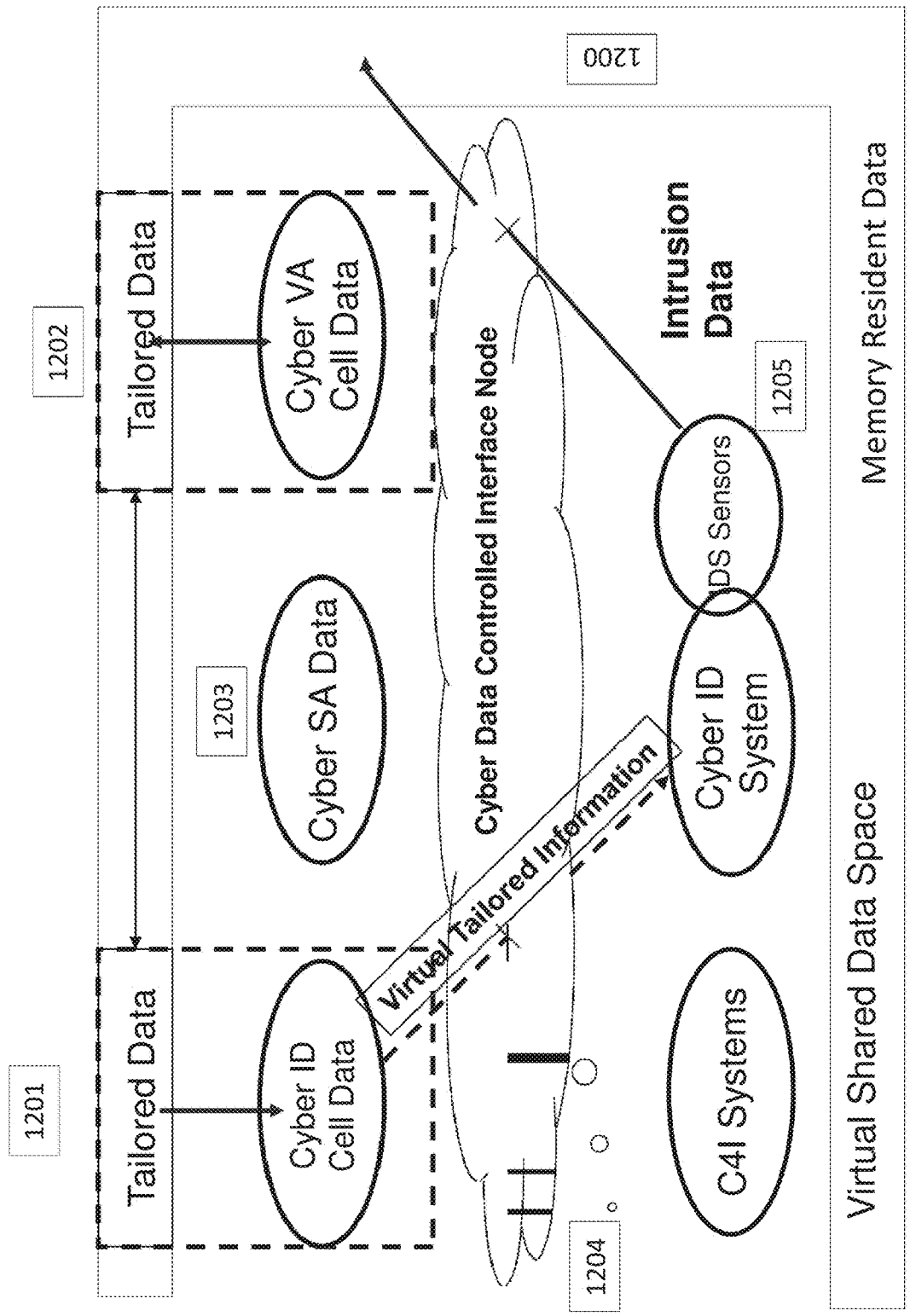
FIG. 12 illustrates how the virtual shared data spaces support the operational cells via a data control interface node and the cells tailored data subscriptions.

FIG. 12 conveys and abstract architectural artifact illustrating the virtual shared data space concept used in the invention. A virtual shared data space with memory resident data 1200 supports multiple publishers and subscribers, 1201-1204 like those in the invention. A Cyber Data Controlled Interface Node, 1204, providing, data readers, data writers, and filters manages publications and subscriptions. The cyber intrusion detection cell (ID), 1201 subscribes to an intrusion detection system. The data reader in the Cyber Data Controlled Interface Node reads the data from the IDS system sensors, 1205 and filters it (e.g., on topic) per the ID cell subscription criteria. Subsequently, the data writer than writes the filtered ID tailored data to the ID cell's shared data space, 1201. This new tailored data now becomes resident in the virtual shared data space, 1200. 1202 illustrates the same for a vulnerability assessment (VA) cell (i.e., the VA cell's tailored data for their mission of vulnerability assessment.

Traditional operational architectures are typically based on hierarchical, report-to, centralized chains of command structures. These traditional hierarchical structures, the mainstay of traditional business and military organizations have shown to be unable to provide rapid dissemination of SA nor information sharing within the planning and of course-of-action (COA) generation timelines necessary to support effective command decisions while conducting cyberspace operations. Furthermore, they do not easily facilitate C2/BM processes across a distributed peer-to-peer environment.

The invention implements an effective operational architectural to minimize or eliminate the deficiencies of hierarchical layers characteristic of traditional command and control organizations and "report-to" C2, is a "virtual organization" (VO). FIG. 12 illustrates virtual cells; i.e., equivalent to physical cells in typical C2 organization. In this example, the cells are 1200, the commander's cell, 1201, the commander's cell in a military AOR or a region of a global enterprise cell, 1202, an intrusion response (IR) cell, and peer vulnerability assessment (VA) cell and intrusion detection (ID) cell and wireless cell 1204. Note the wireless cell is supported by wireless publish and subscribe messaging. In the invention a typical Android and Iphone technology have been instantiated as a wireless cell. These cells are staffed with operators and commanders or managers performing the function of the cells mission (e.g., intrusion response). Further, these cells can perform any mission that is consistent with organizational polices and their CONOPS (e.g., cyber protection team (CPT) cell(s)). Further, these cells are inherently distributed and are characterized by peer-to-peer operational interfaces able to span organizational and network boundaries, naturally allowing for more rapid C2 and BM execution because they operate autonomously, while simultaneously organized as a federated organization. The CyberOps VO of the invention is able to facilitate rapid information sharing, coordination collaboration and synchronization as the basis for conducting distributed C2/BM. Furthermore, operationally powerful and dynamic "on demand" capabilities are enabled by a Cyber VO when designed with a proper software system/SoSs. The major system/SoSs architecture patterns are publish and subscribe messaging, virtual (global) shared data spaces, and peer processing.

The invention can solve many of the difficult operational challenges in Cyberspace operations, such as those challenges (e.g., dynamically creating an organization command structure across organizational and network boundaries, dynamically create cells with tailored data, the cyber capabilities for the emerging threat, and occupied by personnel with appropriate skills, all to optimize performance and effects. Furthermore, the VO can make operational SoSs architectural integration across commands and missions (e.g., kinetic integrated with cyber) rather easy.

Figure 13:
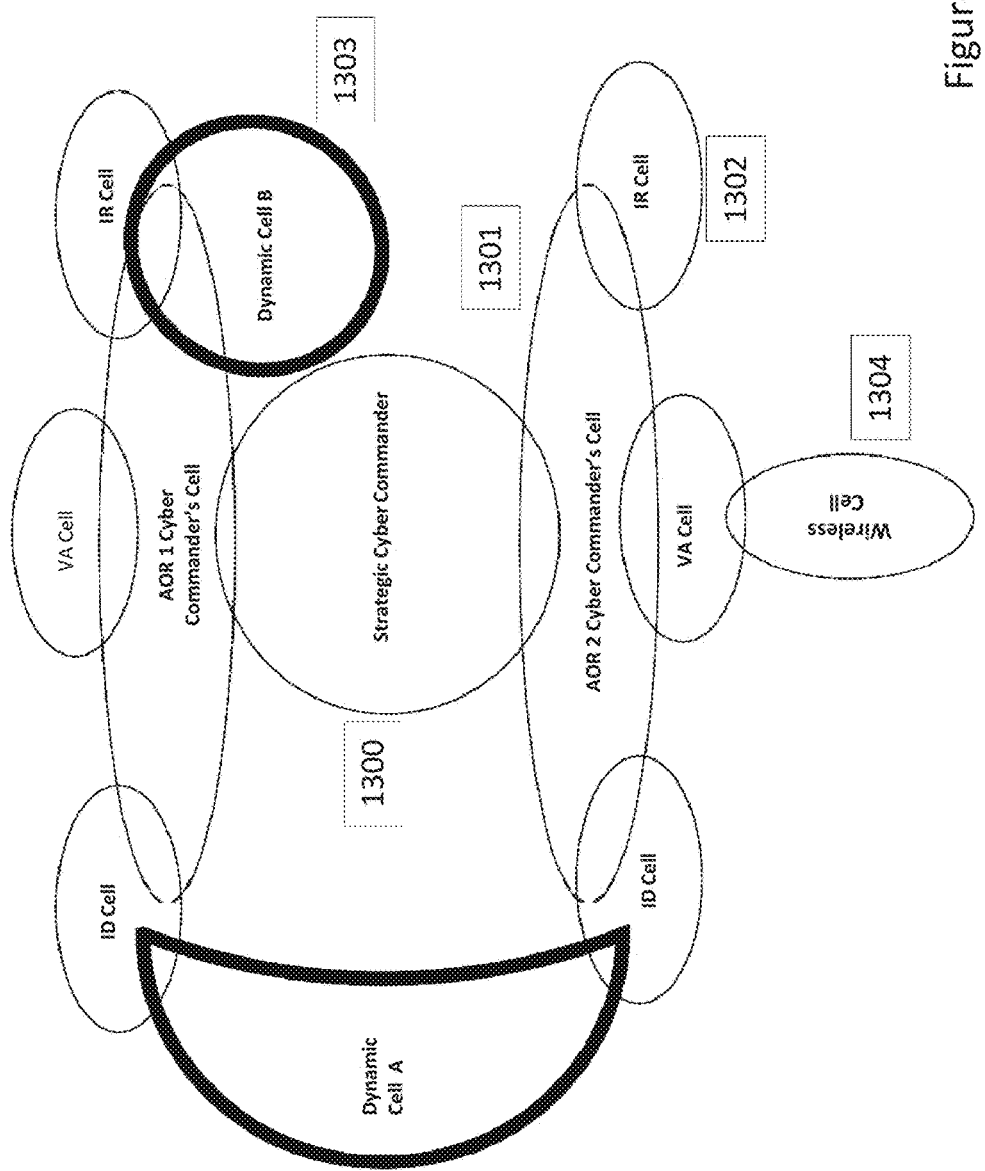
FIG. 13 illustrates the static and dynamic capabilities of the invention's operational virtual cells. It is useful for the discussion of dynamic C2 forms that can be created "on-demand."

The cyber C2/BM cells in FIG. 13, 1303 enclosed with bold lines are "dynamic" cells (i.e., they are created on demand) typically to engage an emerging threat in near real-time. Their instantiation occurs as follows, FIG. 15, but to be discussed in more detail later, herein. Briefly, the dynamic cell is created by 1) instantiating a virtual machine with appropriate supporting services (e.g., its own virtual shared data space), 2) the cell is populated with appropriate tools and capabilities to perform the mission (i.e., the cell subscribes to the tools and capabilities), 3) the cell subscribes to data (e.g., cyber intrusion sensors) needs to perform its mission and the cells virtual shared data space is populated with the "subscribed to" data, and 4) cyber operators join the cell using cell authorization and authentication methods (e.g., NIST 800-53 cyber security controls instantiated when the cell is formed. The cells in FIG. 13 enclosed with a thin line are "steady-state" cells (i.e., they typically operate 24/7).

The Cyber C2/BM invention has two types of operational cells, static and dynamic. Further, either cell type can either be a mission cells or group cell. Defined as follows: 1) mission cells execute one type of mission operation (e.g., intrusion detection, intrusion response, battle damage assessment, cyber protection). A group cell performs multiple missions (e.g., intrusion detection and intrusion response, or cyber protection, battle damage assessment and others, 1-n missions). Either type of cell can be dynamically created or can be steady-state (i.e., exist 24/7).

Figure 14:
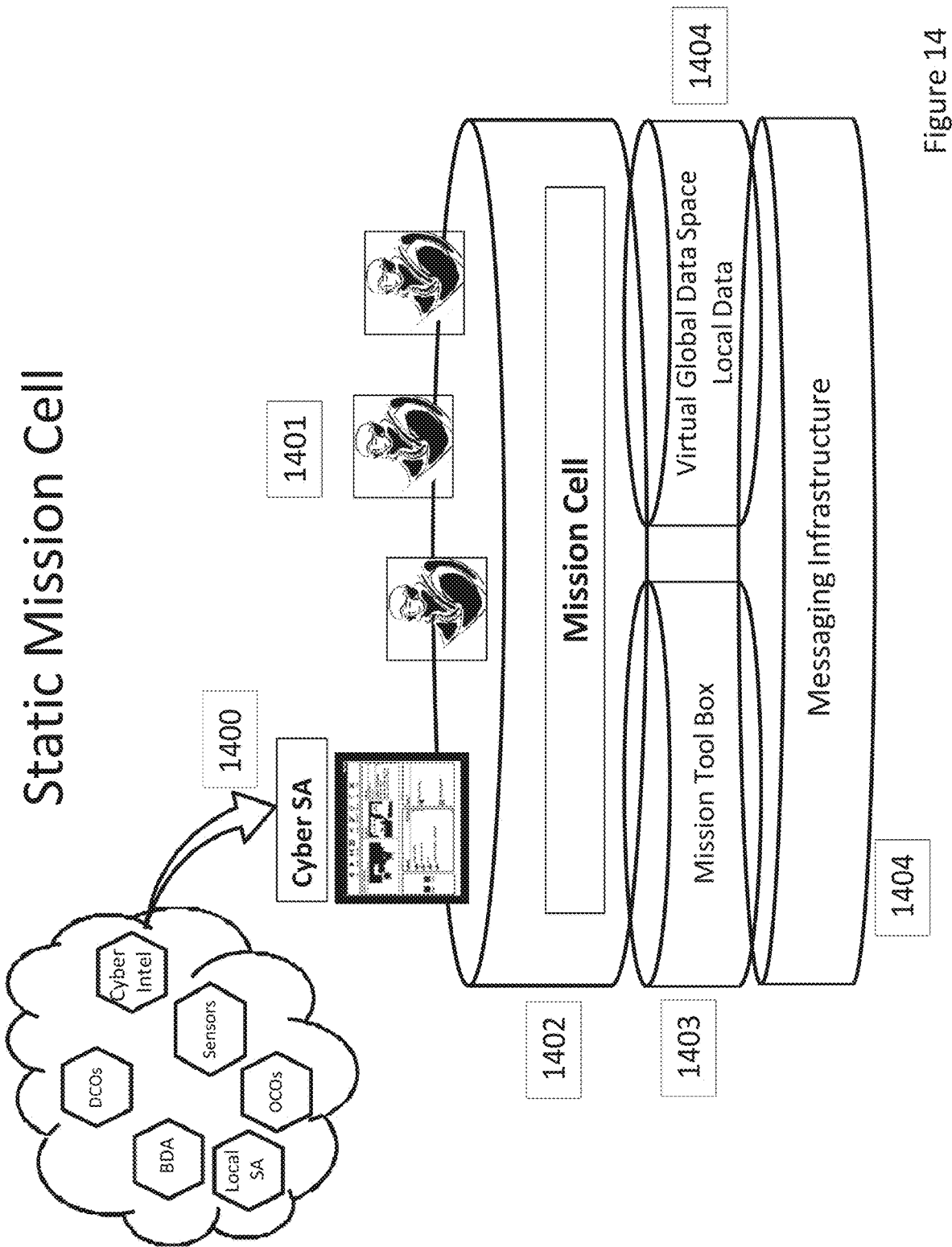
FIG. 14 illustrates an example of the invention's static mission cell. It will be useful for discussion the contrast between itself and a group cell and dynamic cells.

The static mission cell is illustrated in FIG. 14. At 1400 in the diagram all source data is subscribed-to in NRT to continuously update the SA of the battle space and operational activities as events occur in real-time (i.e., the phases of the Cyber C2/BM analytical framework. The subscribed-to data resides in the cell's virtual shared data space at 1404 and is tailored and used by the applications and tools in the cells tool box, 1403. These tools and capabilities are referenced in FIG. 7, 700, C2/BM applications and apply to the specific mission of the cell. At 1401 members of the cell are performing their assigned mission. At 1402 the virtual cell itself is identified and characterized in relation with other architectural elements as illustrated. Again, it can be dynamic or steady state, as outlined above. At 1405 the remaining services are identified as described as in FIG. 7, 701, C2/BM infrastructure services.

Figure 15:
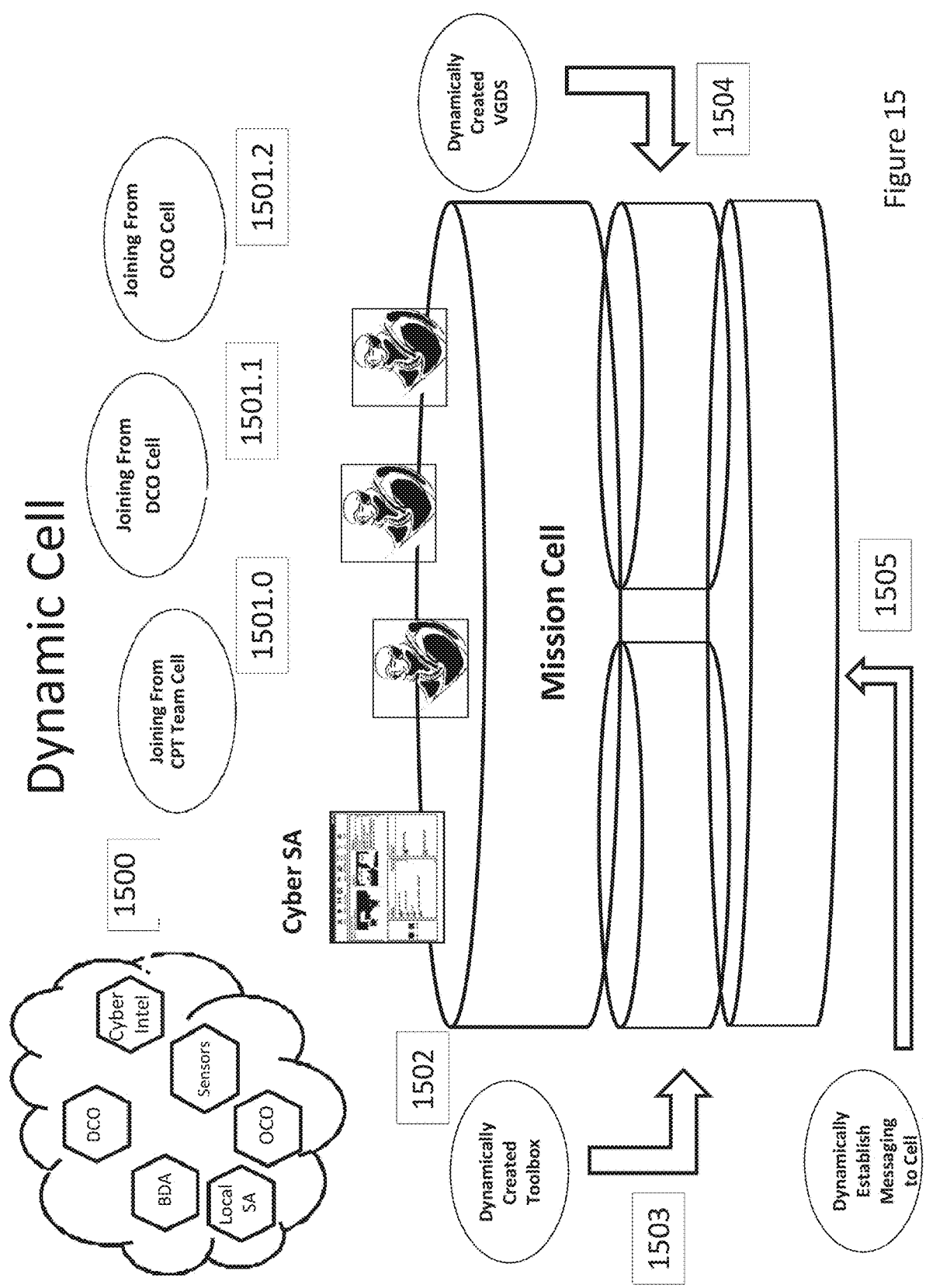
FIG. 15 illustrates the dynamic cell being created on-demand as a group cell. It will be a useful reference for describing a group cell and dynamic cells.

From above, the dynamic cell FIG. 15 possesses the same properties, capabilities and architectural structure as the static cell, however it is dynamically created, typically in NRT to meet an emerging threat or other crisis action requirements identified at higher levels of command or management. At 1502 the dynamic cell is created using a virtual machine(s). To support the dynamic cell, 1502, a tools and capabilities tool box is created congruent with the requirements of the emerging threat or unfolding crisis—the dynamic cell subscribes to enterprise repositories of tools and capabilities (e.g., SA applications, planning tools and capabilities, BDA tools and capabilities). At 1500, tools and capabilities are subscribing to data to support their mission (i.e., tailored data to reside in virtual shared data space). At 1501.0 a member from a CPT joins the cell. At 1501.1 a member from a DCO unit joins the dynamic cell and at 1501.2 a member from an OCO team joins the dynamic cell.

Typically this dynamically created team will be a "hand-picked" to address the emerging threat or crisis. This is an example of the invention's property, "tuning" the architecture to optimize performance and effects (i.e., here, the commander or manager hand picks personnel highly skilled to engage the merging threat, crisis or whatever the need may be—noting the operational architecture not only includes organizations, their interfaces and processes, but human intellectual capital, (i.e., the level of knowledge, skills and abilities (KSAs) can have impact on performance and effects.

As described above 1503, 1504 and 1505 are dynamically created to optimize emerging mission outcomes and are consistent with FIGS. 7, 700 and 701 architecture (i.e., but dynamically mix and match infrastructure services 701 and applications and capabilities, 700 to optimize performance and effects).

Figure 16:
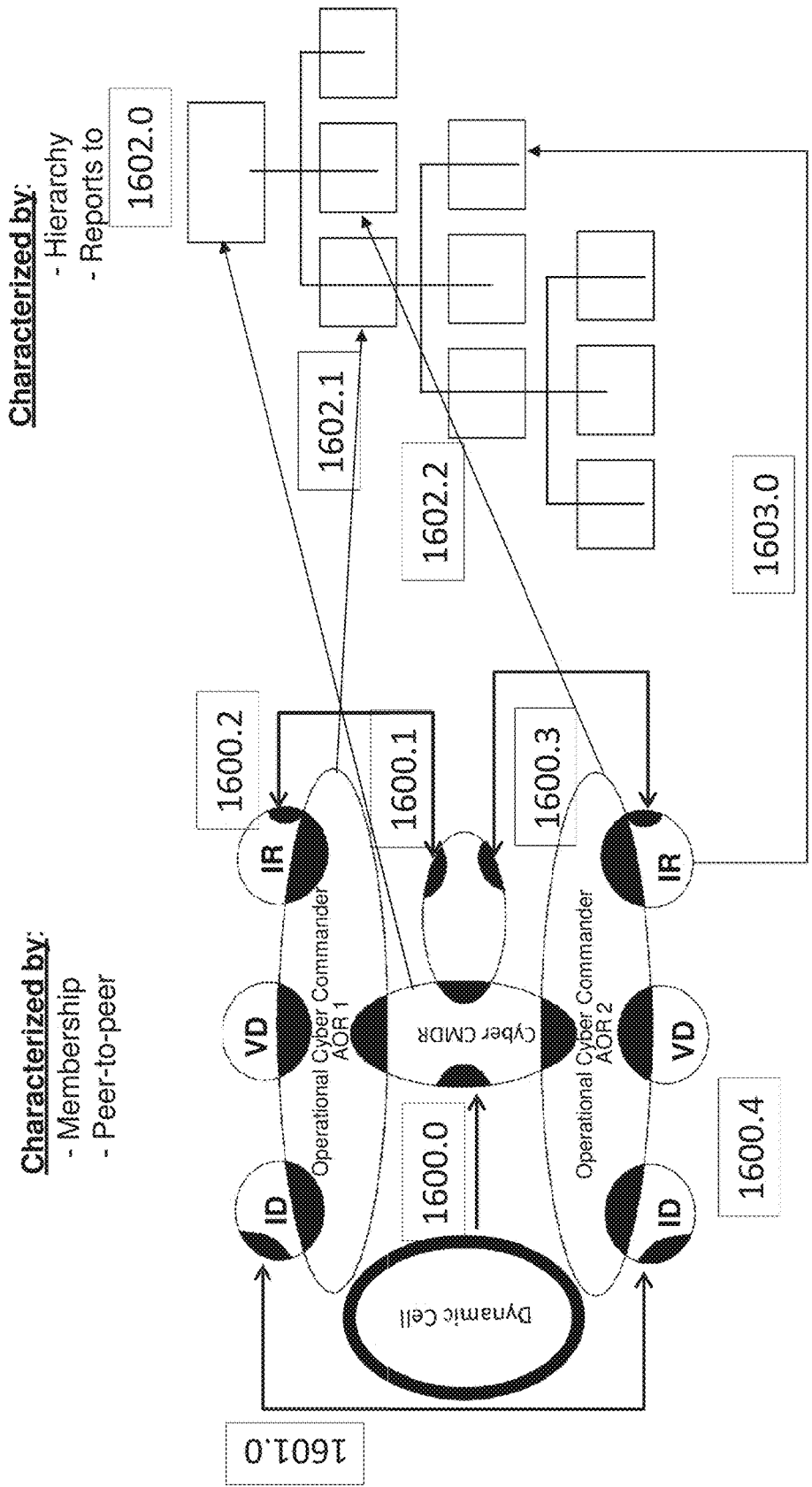
FIG. 16 shows the contrast between a typical hierarchical C2 organization and it virtual organization equivalent and their respective relationships and characterization. It use to illustrate that a hierarchical form can exist and can also operate peer-to-peer.

Traditional military C2 structures are centralized and hierarchical. In FIG. 16, 1603 (right side) the command or top of the hierarchy is illustrated as a traditional military command organization. The command relationships are characterized as "reporting-to" relationships up and down the chain of command. This C2 form is typically used in business as well. The invention can support this hierarchical C2 form if desired. However, employing the invention's VO (left side), FIG. 16, and the commander 1600.0 is shown existing in a cell as a peer to the other cells in the C2 form on the left. But the peer cells, 1600.1, 1600.2, 1600.3 and 1600.4 are subordinate cells in the C2 form on the right, 1602.1, and 1602.2 and so on. The invention allows the power of the hierarchical C2 form (right side), while simultaneously enabling operations as a cell in a P2P configuration (left side). Further, cells can integrate member of the cells in the same manner as mathematical sets intersect (e.g., 1600.2 and 1600.1). The diagram on the left also illustrates an instantiation of a dynamic cell, 1601.1 (from FIG. 15), which is integrated with ID cells at 1600.2 and 1600.4 levels. These cells are also attached to AOR 1, at 1600.1 and AOR 2, at 1600.3. The VO C2 form is characterized by membership and P2P operations, while simultaneously maintaining the ridged structure of the hierarchical form, if desired.

Figure 17:
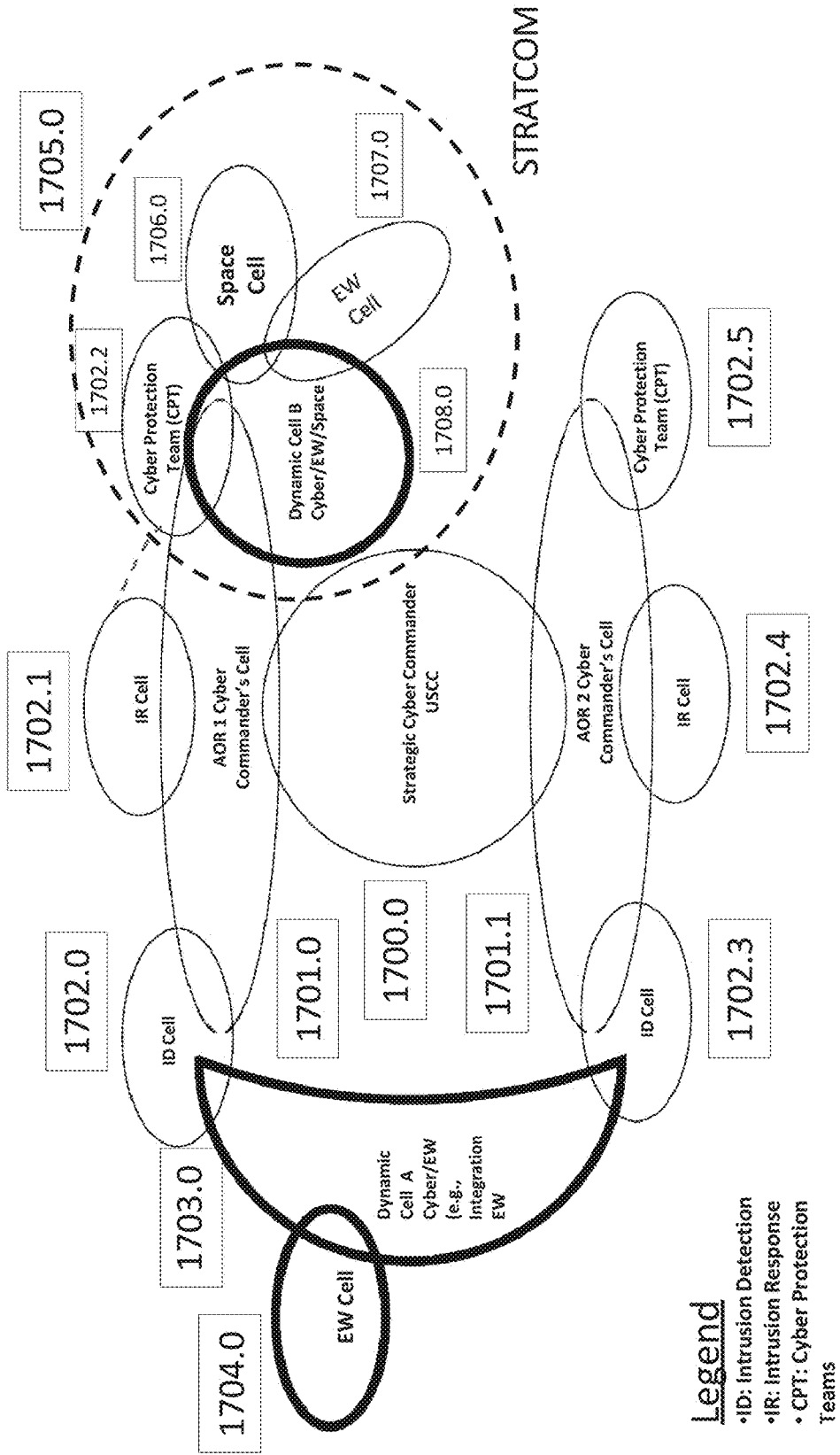
FIG. 17 illustrates the dynamics of the cells instantiating a SoSs mission with multiple organizations and a dynamic C2 form across organizational and network boundaries to optimize mission outcomes. It is useful for illustrating the dynamics and mixing and matching of missions and capabilities, on-demand.

The dynamic creation of SoSs C2/BM mission configuration is illustrated in FIG. 17. FIG. 17 also demonstrates another instantiation of different missions and their mission systems, thus creating a SoSs from multi major missions' areas; reference the STRATCOM mission cube for major mission areas and their relationships to submissions and their mission essential tasks (METs), FIG. 23. At 1705.0 the integrated missions and systems are created, they are: 1702.2, a cyber CPT cell, (note its integration, dotted line, with the Cyber IR Cell 1702.1. The dotted line indicates coordination, synchronization, or any other C2/BM related activities; also Inclusive in the SoSs mission integration is a Space cell, 1706.0 and electronic warfare (EW) cell, 1707.0. The intent in this illustration is for the cells, 1702.2, 1706 and 1707 to be static cells, so the inventions dynamic group cell can be demonstrated. The commander of this mission is the area of responsibility AOR 1. What also occurs at 1708.0 is the dynamic creation of a group cell, defined earlier herein. Group cells can be static or dynamic, but they are distinguished from mission cells because they have members from multiple mission areas as is illustrated at 1702.8 In the case illustrated, members from the integrated static cells attached have created a group cell to work a specific tasks that involves member from their perspective areas.

The C2/BM configuration is identical to FIG. 13, with the exception of the inclusion of the STRATCOM major mission integration. AOR 1, 1701.0 could be another major combatant command (COCOM); e.g., CENTCOM, EUCOM. The C2/BM configuration illustrates the ease of integrating major mission areas across major global commands or a geographically disturbed enterprise. It follows, submissions and their associated METs will map to cells as needed per mission requirements. As described in FIG. 16, the hierarchy of command can be dynamically established and maintained, while simultaneously operating as peers with federated autonomy.

The dynamic cell creation in FIG. 16 is established and supported by the system architectural descriptions services described in FIGS. 9-12 and operational architectural illustrations in FIGS. 8, 13-19 and 22-25. The analytical framework applies as described in FIGS. 3, 4, 8, 20, 21, and 23.

Figure 18:
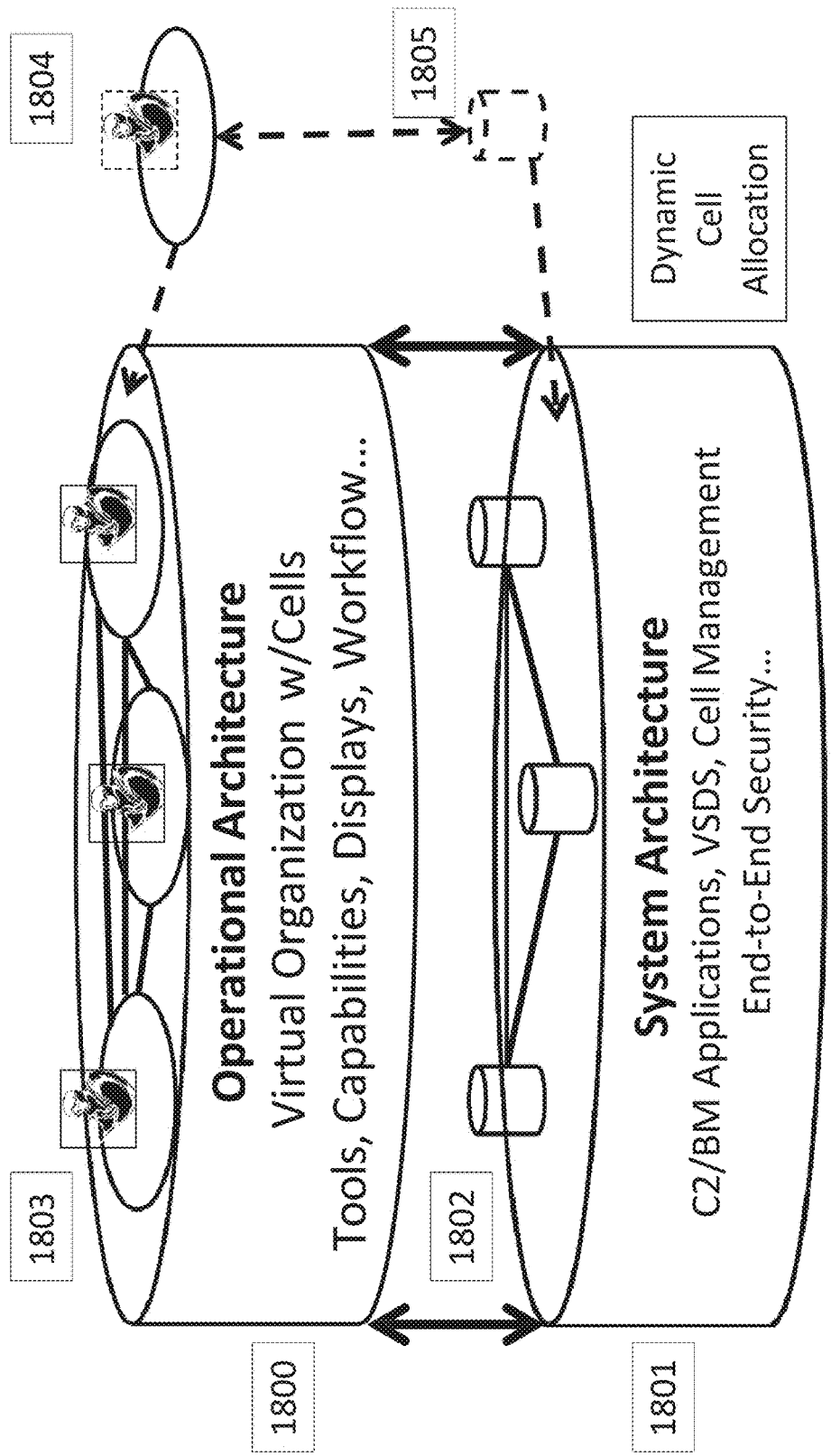
FIG. 18 illustrates the creation of a dynamic cell that is "tuning" its operational and system architecture of the invention tuning to optimize effects and desired outcome; i.e., the right people, tools, data, and information to perform it specific mission. It useful for illustrating the adaptability and dynamics of the architecture.

Tuning the C2/BM architecture system/SoSs and operational architecture to high congruence for optimal effects is illustrated in FIG. 18. The cell is described as in FIG. 7, C2/BM application layer 1800 and infrastructure layer 1801. As a mission or threat emerges in this example, a new mission member joins 1804 the cell. For the purpose of illustration, this mission force member joining the static cell is an "expert" in the cyber event area that is unfolding in real-time. This mission member could be a member of a national CPT or any other team creatable in the operational architecture in part or total (i.e., 1-n members joining the static cell. Simultaneously, at 1805 unique tools and capabilities to address the emerging event, are being published, see FIGS. 9-12 for architecture patterns employed (i.e., DDS middleware publish and subscribe, virtual shared data spaces) to the cell. The tuning is defined as rapidly integrating the "right" cyber force member(s); i.e., experts, tailored data to support the emerging threat or mission, the "right" tools and capabilities for the mission (an analogy would be the "right" ordnance on a bomber to destroy a specific target of difficulty) and the optimal integration of the "C2 form" FIGS. 13-17 (e.g., dynamic, adaptable VO operational architecture) and the "right" system applications and infrastructure services, FIGS. 7, 700 and 701 to optimize effects.

Figure 19:
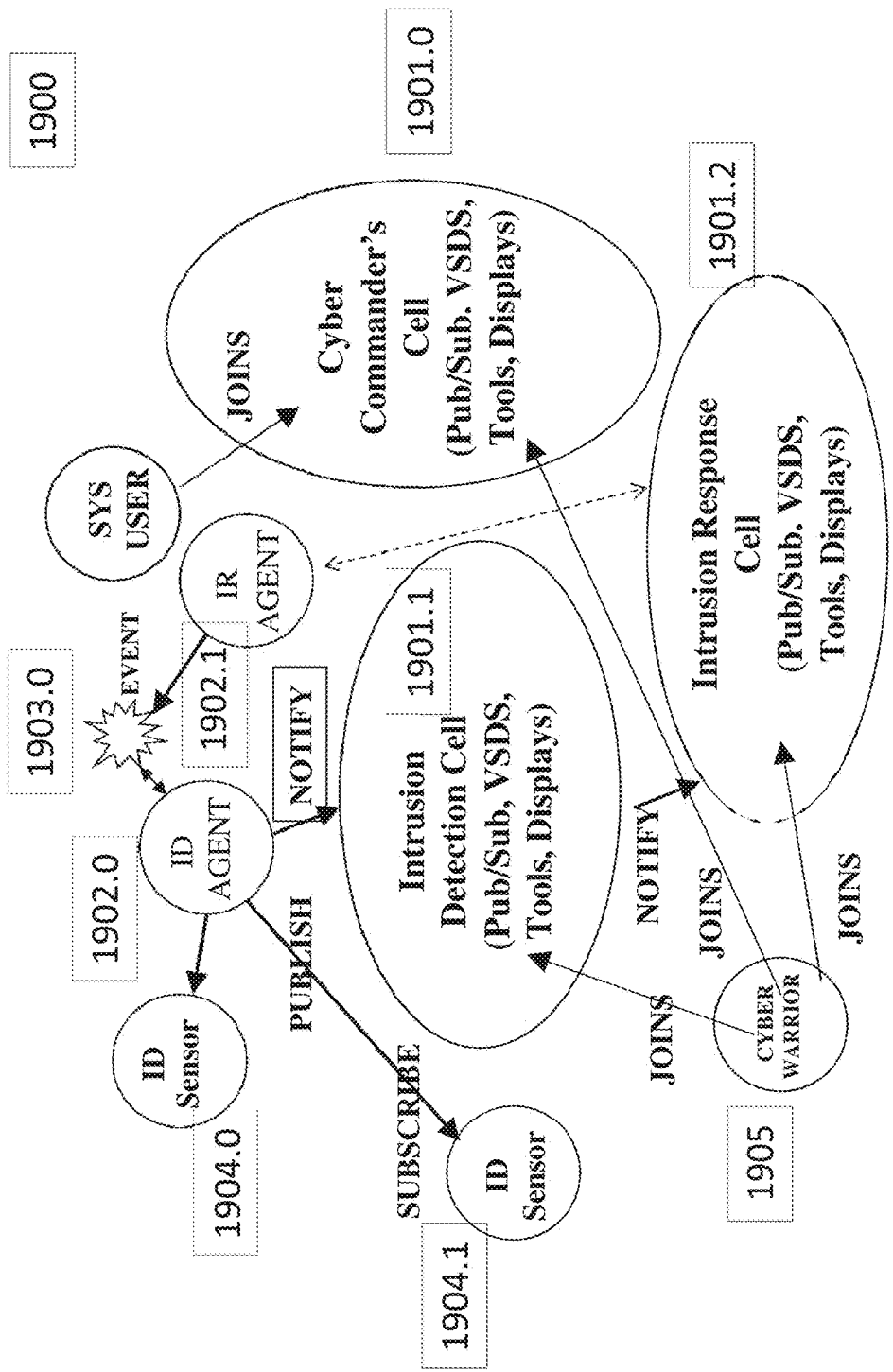
FIG. 19 describes how the capabilities (e.g. publish, subscribe, coordination) of the invention are employed to engage a tactical cyber event employing a mobile agent. It's useful for illustrating event engagement, information flow, sharing information, and operational coordination.
Figure 20:
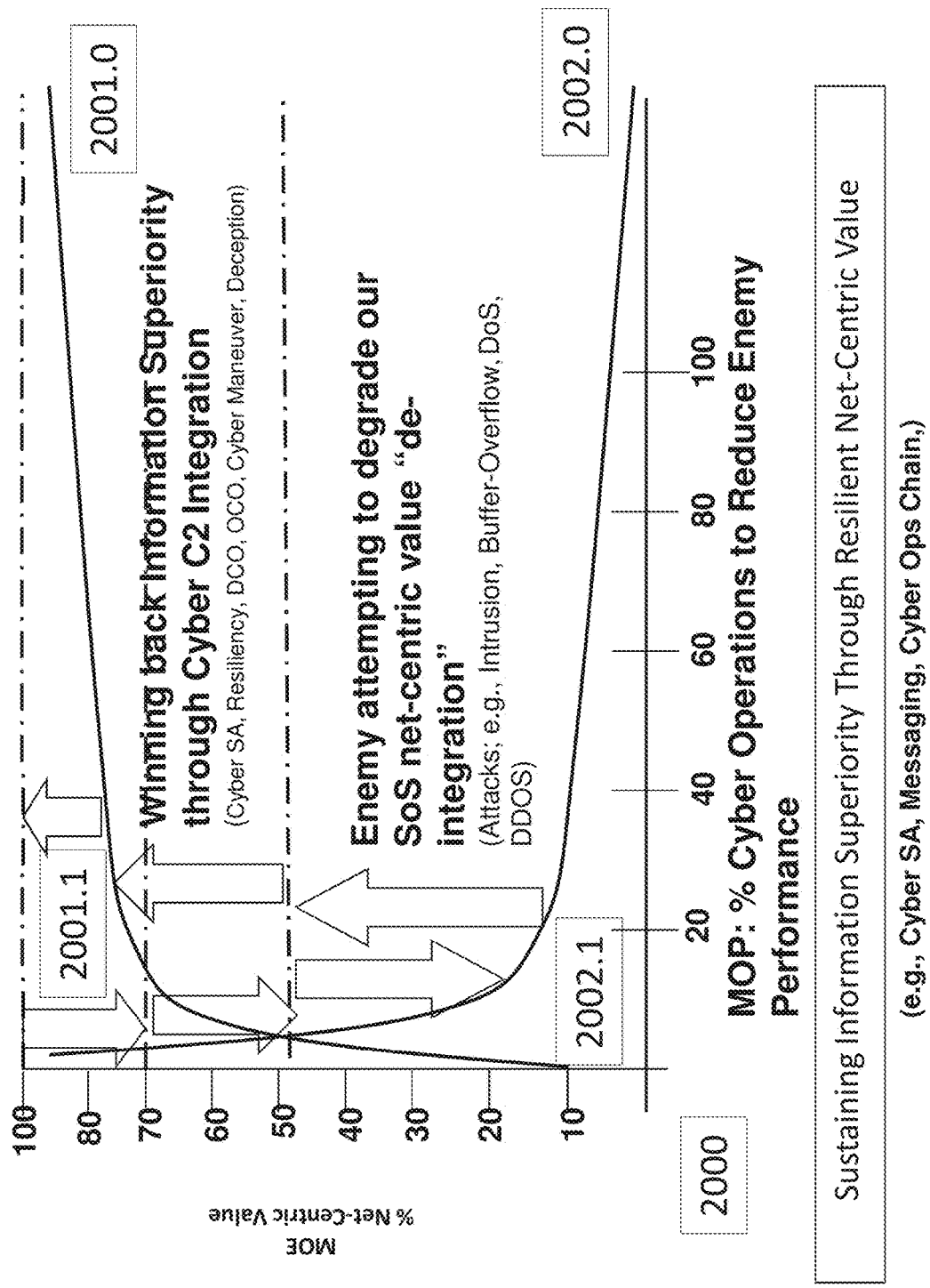
FIG. 20 graphically depicts adversaries' competitive struggle for information superiority. It is use discussion measure of performance (MOPs) and measure of effective (MOEs) analysis.

The invention includes a mobile agent environment and management systems as illustrated in FIG. 19. A random algorithm, which also guarantees uniform coverage of the enterprise's network and computing assets, controls the dispatching of agent patrols. The randomness insures that both intruders and legitimate users do not know when an agent will show up unannounced at any node. This makes it harder for intruders to defeat the built-in security measures of the system and for legitimate users to circumvent the security policies of the system/SoSs they're using. These dynamic properties of the invention makes it difficult for adversaries to conduct intelligence preparation of the battle space (IPB) or enterprise because cells and mobile agents are continually presenting the adversary a different picture of the theoretical and physical defended systems/SoSs. Mobile agents are typically developed in NRT in the engineering cell of the invention. Mobile agents are desirable for focused tasks, or random roaming network patrols (e.g., cyber recognizance) in search of ominous code or data or "quick responses." and are technically and operationally tailored to actions (e.g., an emerging threat event and are dispatched to a system device to engage that event (e.g., send a tailored intrusion signature to all devices in the enterprise and have the agent begin to communicate and correlate findings)). Typically, the agents are "light" from a functionality software capability (e.g., performs a single or small number of functions or procedures). The oval 1900 represents the computing environment (e.g., global Internet) enterprise environment where cyberspace operations occur. There are three Cyber C2/BM cells from the invention represented in 1901.0, 1901.1 and 1901.2 and are used here to illustrate a tactical scenario. These cells are: commander's cell, intrusion detection cell, and intrusion response cell. In the example, 1902.0 is a dispatched agent dispatched from 1901.2, intrusion detection cell. The agent, 1902.0 has a custom signature (the tactical scenario assumes an anomaly has occurred that is consistent with an enterprise cyber attack warning alert) has been dispatched to investigate.

Agent 1902.0 detects an event consistent with the enterprise warning (i.e., cyber-attack event at 1903.0). Employing their DDS publish-subscribe capability, dispatched agent 1902.0 begins publishing results to intrusion sensors, 1904.0 and 1904.1 and notifying the ID cell's VSDS and its SA displays, 1901.1. The ID cell then begins coordination with the IR cell 1901.2. Simultaneously a cyber warrior joins all three operation cells virtually at 1905 in FIG. 19, this represent an example of the invention's dynamic adaptability (i.e., putting cyber operators where they need to be in NRT). In this scenario, the cyber warrior takes command of this tactical event and begins coordination with the intrusion response 1901.2 cell, the intrusion detection cell 1901.1 and the commander cell 1901.0. The resulting dynamic C2 form that is created in this scenario is two tiered across all three cells (i.e., tier one is the commander's cell, 1901.0, and the subordinate cells, 1901.1 and 1901.2 make up the second tier, subordinate tier of the dynamic command structure created for this event). However, from FIG. 16 it can operate as P2P.

The ID cell, 1901.1 utilizing the DDS services, FIGS. 9-12 to notify the IR cell 1901.2 of their event detection. The ID 1901.1 cell continues to update its VSDS, illustrated in FIG. 12 from agent 1902.0 notifications. The IR cell's response agent (explained below) continues to update the IR cell VSDS and its SA as they learn more about the event unfolding (i.e., SA updates). The IR cell 1901.2, continuously informed by updates from the ID cell, 1901.1, begins to develop COAs to engage the, and selects a COA. In coordination with the engineering cell (not pictured, but discussed earlier) of the invention, the IR cell 1901.2 creates a response agent, 1902.1 and dispatches it to neutralize the attack. This scenario illustrates the employment of the analytical framework phases, FIG. 3 inclusive through execution. After execution, the analytical framework BDA phase, FIG. 3 would be applied and the entire processes would complete and iterate, if necessary, until the threat is neutralized.

During conducting and execution of cyber operations the fundamental goal is to maintain information superiority over ones competition or adversary (i.e., the ability to process and create decision ready information faster and with better quality than ones opponent). It is at the essence of information superiority. The FIG. 20 diagram graphically contrast the rival opponents' competitive struggle to obtain and maintain information superiority (i.e., their MOPs to MOEs analysis, 2000).

The x-axis quantifies the percent of cyberspace operations capabilities and resources applied (MOPs) and the y-axis is the percent information-centric value (i.e., information superiority) maintained or achieved (MOEs). The resources and capabilities include, technology (e.g., high performance, adaptable Cyber C2/BM system/SoSs), CyberOps Chain (i.e., the analytical framework), and the information value MOPs to MOEs chain), processes (e.g., best algorithms), data/information, human intellectual capital (i.e., KSA levels); all are input variables informing the MOPs and MOE and their criteria (i.e., all are elements of the operational and system/SoSs) architecture).

The downward arrow and resultant graph 2001 illustrates one actor applying cyber attack to decrease their opponent's information centric value. As more and more cyber attacks) occurs against their opponent, their opponent's information centric value (i.e., MOEs) and cyber performance (i.e., MOPs) declines. However, simultaneously, the upward arrow and resulting graph 2002 illustrate their opponent's attempt to applying greater defensive countermeasure (MOPs) to increase information centric value (MOEs) to neutralize the attacks. As the adaptive Cyber C2/BM system/ SoSs operational and systems architecture are tuned to achieve greater and greater desired effects and performance (i.e., offensive and/or defense) their reaches a "knee" in the curve, 2001.1 and 2002.1. At this point on the graph, the MOPs to MOEs analysis yield the best effects and performance intersection. As the graph illustrates, at this knee in the curve point, more performance yields lesser and lesser effects (i.e., the cost to achieve greater effects has a disproportionate cost in performance.

Figure 21:
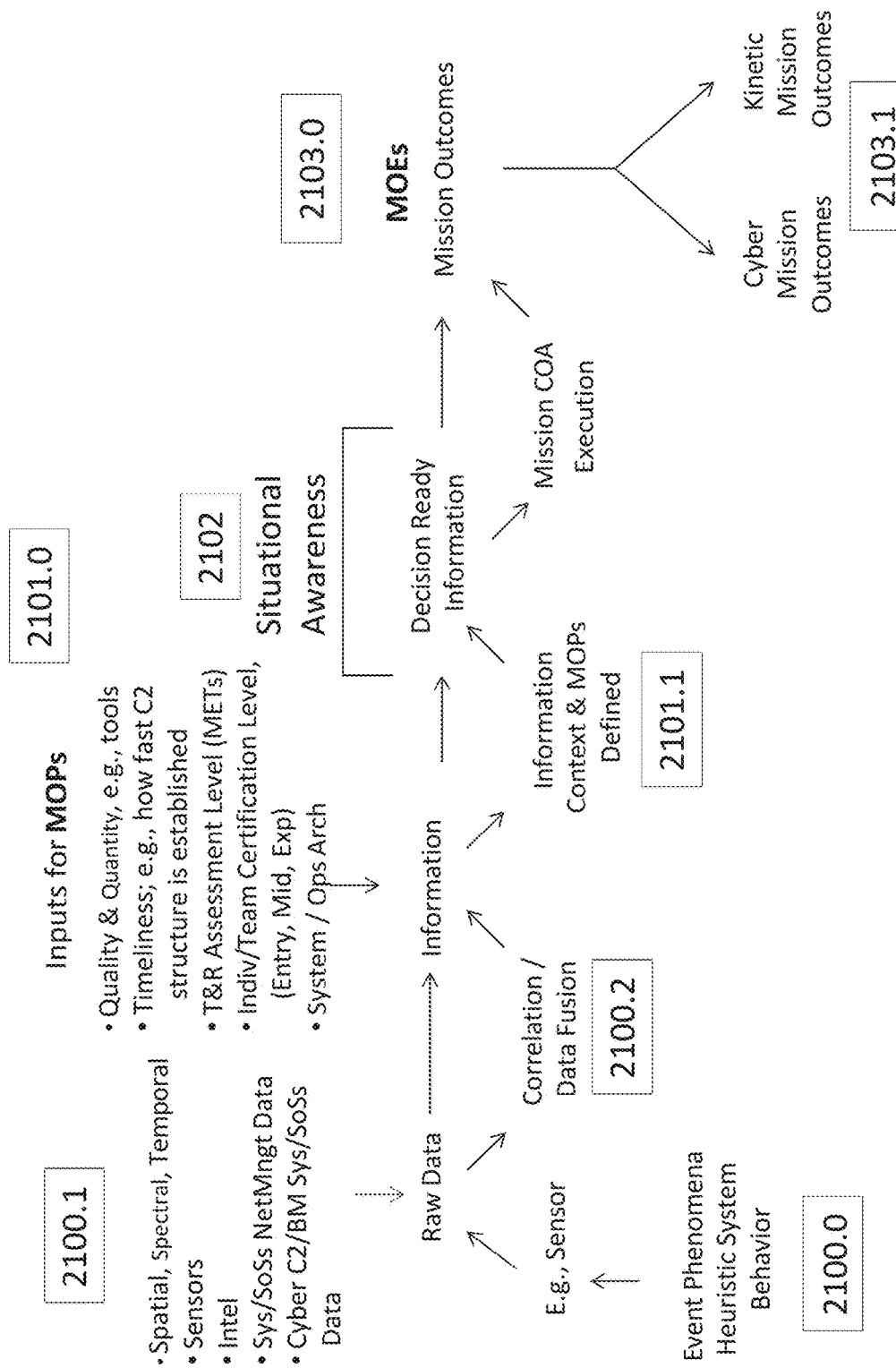
FIG. 21 describes the MOPs to MOEs information value analysis chain (M2IVAC) created with this invention. It useful in the discussion of MOPs to MOEs analysis.

The information value MOPs to MOEs analysis chain (M2IVAC) is described in FIG. 21. At 2100.0 a System/SoSs event phenomena occurs and triggers System/SoSs abnormal behaviors; the event(s) unfolds, the heuristic process begins on the part of the cyber (and kinetic if kinetic-cyber SoSs is architecturally integrated) operators. Operator knowledge, skills, and abilities (KSAs) are one input variables of the MOPs to MOEs analysis framework; the dynamic and addable architecture properties of the invention are another (i.e., the continuous tuning of the architecture to achieve high congruence with the mission and the mission essential tasks (METs) in NRT to optimize effects. At 2100.1, continuous feeds of possible spatial, spectral, and temporal, sensor, Intel, Sys/SoSs, NetMngt (DoDIN—Department of Defense Information Network Operation in DoD) and other source data are provided from the processing of the Cyber C2/BM analytical framework, FIG. 6. At 2100.2 this raw data is fused with specific applications (FIG. 7, 700), is correlated and is transformed into usable operationally information, where at 2100.1 MOPs are developed and applied considering criteria such as but not limited to:
1. Quality, Example MOP: Grade A-F or A=90-100 (4 points), B=80-89 (3 points), C=70-79 (2 points) and so on.
2. Quantity, Example MOP: Example MOP: 1-n count, defined dynamically by mission. Score of n equate A (4 points); n-x equates to B (3 points)
3. Tools and capability evaluation score. Example MOP: Grade A-F or A=90-100, B=80-89, C=70-79 and so on. Standard 4-0 points apply per grade.
4. Timelines, Example MOP: seconds, minutes, hours; defined dynamically by mission. Score of A or 100 equates some time, some delta time/range equates to B, and so on.
5. Training and readiness (T&R) assessment levels (score) based on performing mission essential tasks (METs)
a. Team: Example MOP: Degree completion of MET, % Complete/Time equates to some score range 0-100/A-F/0-4 points; each level multiplies by weight 0≤1 per level of expertise.
6. Individual: Example MOP: Grade A-F on individual role in task, same as 1.
7. Certification levels
a. Individual, Example MOP: entry, midlevel, expert; equates to some number;
b. Team: Example MOP: Grade A-F, same as 1.
8. Adaptability: Performance of the System/SoSs and operational architectures (including operator's KSAs) employed to dynamically tune for high congruence to achieve most optimal effects, Example MOP: Time to dynamically reconfigure (i.e., tune) operational and system/SoSs architecture's implementation to achieve continuously improved outcomes; T=time, X=ΔT. ΔT is defined per mission requirements or for T&R assessments.
a. Tn≤x equates to A score (4 points);
b. Tn+1≤xΔt equates to B score (3 points);
c. Tn+2≤xΔt equates to C score (2 points);
d. Tn+3≤xΔt equates to D score (1 points);
e. Tn+4≤xΔt equates to F score (0 points);

Different mathematical models for Cyber MOPs to MOEs analysis can be used and will evolve as practitioners operate in cyberspace and use the invention. The invention accounts for their integration as new applications, FIG. 7, 700 layer. Today, they are not well defined. A simple example to evaluate criteria against mission effectiveness would be to apply weights to different criteria per a given mission (i.e., dynamically weight criteria as threats emerge and measure based on desire outcomes). Examples definitions include:

X is any MOP criteria score, where the numbers of MOP criteria scores are Xn

W=W>0≤1 is the weighted value of any given Xn

The MOP weighted value is MOPw=Xn*Wn

Average $MOPa=((\Sigma MOPwn)/n)$

Using criteria 6 as an example, an entry level operator has a lesser weighted performance value than a midlevel operator and a midlevel operator less than an experienced operator. Considering criteria 7 as another example, distributed system architectures have identifiable and quantifiable performance characteristics and relationships. For example, given everything else being equal, the implementation of a distributed system/SoSs, employing a request-reply messaging models are known to be orders of magnitude slower in speed (timeliness) than a publish-and-subscribe messaging model. Operationally, it may be determined given emerging threats that one architectural pattern is weighted higher than another. Another example could consider the performance of a centralized C2 model vs. a distributed C2 model, the implementation of the two C2 models will have different performance capabilities; centralized and distributed C2 configuration models are illustrated in FIGS. 1, 2 and 9. As discussed, the C2/BM invention is designed to "tune" it operational and System/SoSs architecture to optimize performance and effects (i.e., MOPs and MOEs). The operational situation may dictate one model over another—the invention can tune to the desire model in NRT by dynamic reconfiguration (e.g., see dynamic cells, FIG. 15).

The intent of the invention is not to provide the metrics models or their technology designs or implementations, but rather the analytical framework FIG. 3, and the high performance, adaptable Cyber C2/BM architecture, FIGS. 1, 2 and 7, where Cyber MOPs to MOEs analysis tools and capability (applications) can reside, see FIG. 7, 700 application layer, and enable timely cyber MOPs to MOEs analysis employing the analytical framework, FIG. 3.

Sophisticated MOPs and MOEs metrics should be tailored to the event phenomena (e.g., class of attack) or target (e.g., server). One reason for this is different computing patterns have different performance behaviors and effects outcomes because of their designs. For example, a relational database will inherently have different computing behaviors (e.g., performance) than that of an object oriented database or, one implementation of scanning tool may behave differently than another vendor's implementation of the tool. These behaviors and variances need to be reflected in MOPs to MOEs definitions and analysis models.

Information, 2100.2 is transformed into information context with MOPs metrics 2101.1 are provided and Inform SA, 2102 and identified as "decision ready" information. COA and mission execution is identified, but not discussed in detail here as it's not specifically germane to MOPs to MOEs analysis—execution has already occurred and SA will be updated with output from MOPs and MOEs analysis. See FIGS. 3, 302 and 304 for mission COA selection and execution. After execution, the members of the battle damage assessment (BDA) cell, see FIGS. 13-20 for various representations of mission, and dynamic group Cyber C2/BM cells that evaluate mission outcomes employ MOPs and MOEs tools and capabilities (FIG. 7, 700 application layer) to evaluate mission effects.

Consider a denial of service (DOS) attack on a server. An example, MOE: What was the level of server degradation or neutralization? (This is typically a percentage degraded measurement) vs. MOP: How long can we keep it at a certain state of degradation or inoperable? (This is typically a time measurement).

This output information then updates the SA picture using feedback loops, see FIG. 3, 306. If the desired effects are not achieved, the MOPs to MOEs analysis informs commander via updated SA and they in turn will continue execution the cycles of the analytical framework. Subsequently, the Cyber C2/BM system/SoSs and operational architectures will dynamically tune together to achieve higher congruence at each iteration (e.g., reconfigure, cells, tools and capabilities and data) in NRT until the desire result is achieved. Commanders and managers will also be interested in the relationships of cyber effects on the kinetic missions, 2103.1. As discussed, the invention integrates cyber and kinetic operations. This portends integrated MOPs to MOEs definitions and metrics.

Figure 22:
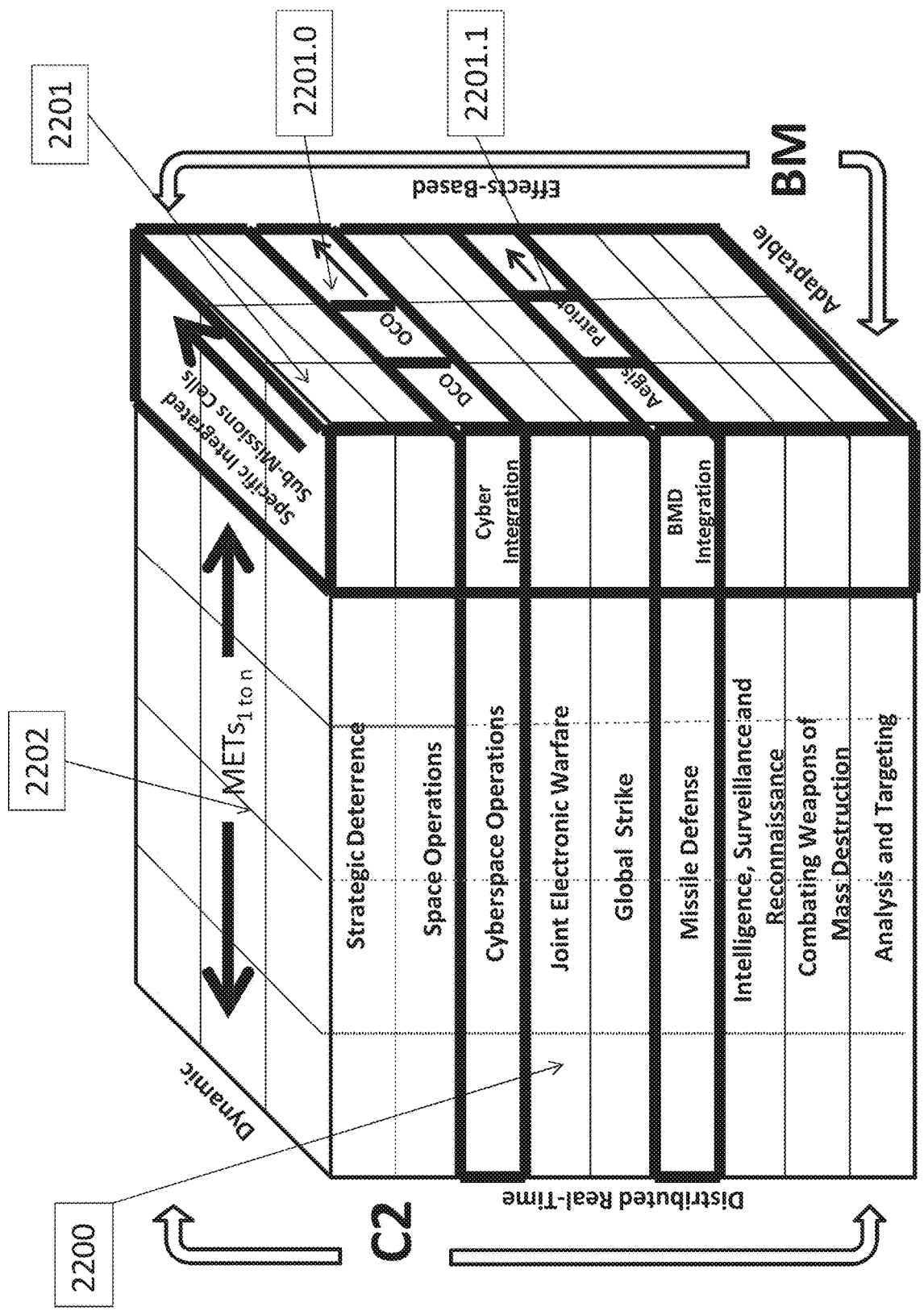
FIG. 22 describes a mission portfolio of USSTRATCOM and associates submission with their major missions and mission essential tasks (METs) in a cubical relationship. It is useful discussing how the inventions dynamically integrates missions, submission and their associated METs.

FIG. 22 is three dimensional cube described as a "mission integration cube." Its front face shows major mission areas 2200 of U.S. Strategic Command (USSTRATCOM), but the mission cube can be used to frame missions of any military or non-military organization and the invention can accommodate all configurations. At the right cube face, 2201 the submissions of the each major mission area, 2200 are identified. At 2202 the mission essential tasks (METs) for each submission, 2201, are identified at the top of the cube face 2202. At 2201.0 and 2201.1 two submissions, 2100 are selected for C2/BM dynamic integration. In each submission, METs will be selected based on the operational requirements. Mathematically, this can be represented as:

DMm=Dynamic Mission Instantiation, where m is any dynamic mission instantiation

DCd=Dynamic Cells, where d is the number of dynamic cells integrated

SCs=Static Cell, where c is the number of static cells integrated dynamically

Ct=Total number of cell, where t is the sum of DC and DC integrated into the dynamically created instantiation Xx=METs, where x is the number of METs selected for the dynamic mission Yy=Major Missions, where y is the number of major missions integrated Zz=Major Mission, Sub-Missions, where z is the number of major mission, submissions instantiated $$DMm=\Sigma Xx+\Sigma Yy+\Sigma Zz \text{ and } Ct=DCd+SCs$$

As this dynamics integration occurs, static FIG. 13 and dynamic FIG. 14 cells will be identified, created and integrated per the dynamic, adaptable described previously herein, along with the appropriate dynamic C2 form(s). This can be mathematically defined in a similar manner. Any combination of the set (Xx Yy Zz DCd SCs) can be created to form a dynamic mission DMm instantiation. Example C2 forms can be derived from FIG. 1 and FIG. 2 and all varying forms the architecture's invention will manifest itself into. Formal, mathematically defined C2 forms integrated with two major missions, FIG. 22 and FIG. 23 will follow herein.

Figure 23:
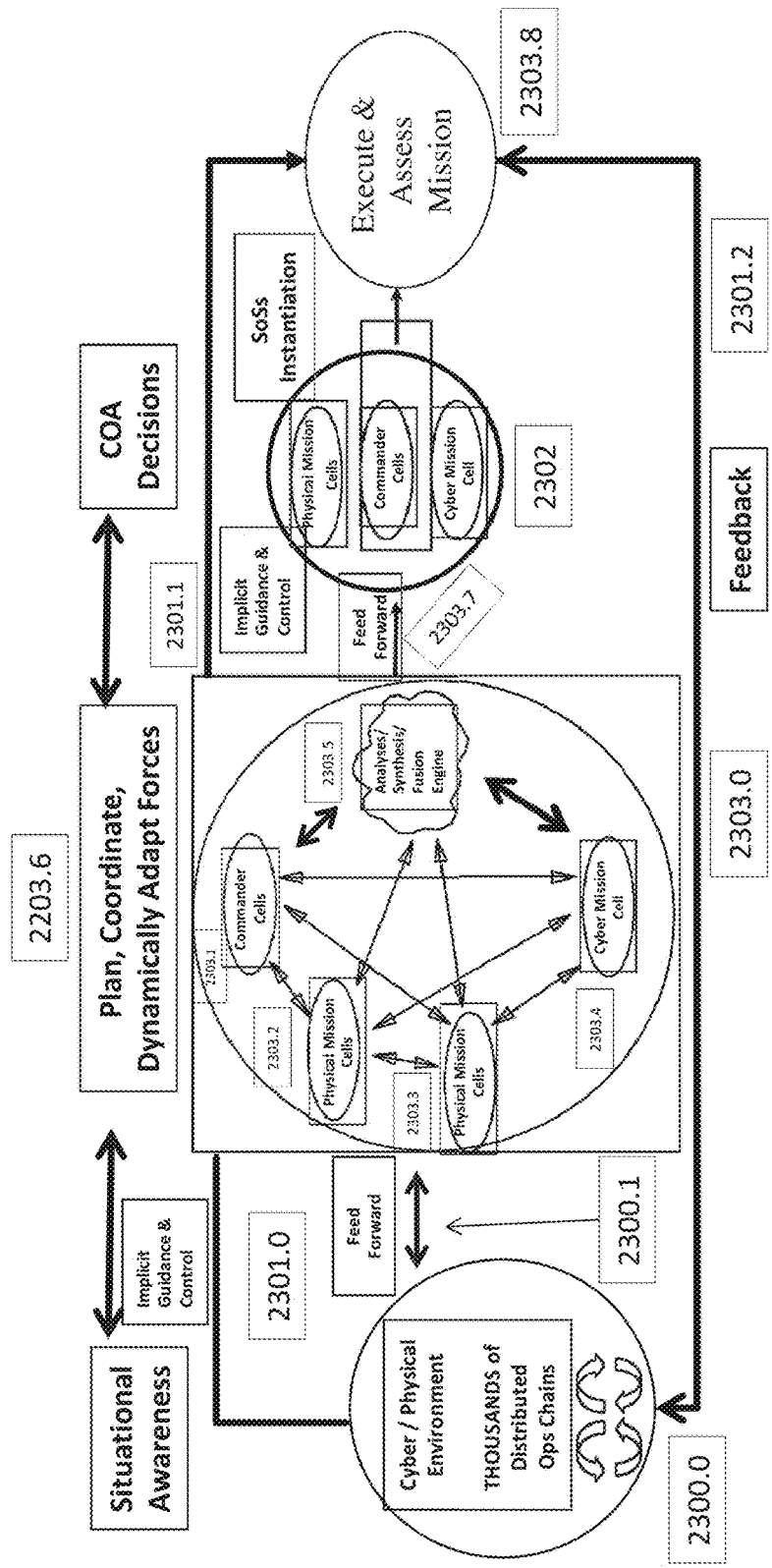
FIG. 23 is a detailed process diagram illustrating the application of the analytical framework as forces form and reform dynamically in time and space (e.g. cyberspace and kinetic battlespace).

FIG. 23 illustrates the invention's analytical framework and the dynamic, synchronous and asynchronous processes of forming a mission C2/BM structure from two desperate systems creating a SoSs of two C2 forms (i.e., cyber and missile defense). At 2300.0, the analytical framework processes operational chains across the kinetic and cyber battle space informing kinetic and cyber C2/BM cells 2300.1-2300.5. The mechanisms for processing and storing were architecturally were illustrated in FIGS. 1-11 and discussed in the related text herein. At 2301, implicit command guidance and control is fed back with continuous feedback loops 2301.2 to the analytical framework (i.e., each cell(s) are performing their missions. At 2300.0 all C2/BM cells are performing their respective missions and sharing the mission data based on their mission needs and all are configured as in FIG. 6 (i.e., all are associated with a C2/BM federated system executing the analytical framework, illustrated at 2200 in FIG. 23; 2303.5 corresponds to applications performing synthesis, analysis and fusion and exist in the architecture at the application layer of FIG. 6. The data flows are based on user needs and processed into decision ready information at 2300.5. Publish-subtribe and virtual shared data spaces are the architectural patterns enabling this information sharing and data storing between the operational cells as illustrated in FIGS. 9-12 and texturally described herein.

At 2303.6 and event occurs that triggers the adaptable, dynamic creation process of cyber-physical SoSs integration with appropriate cells as illustrated in FIG. 22 and associated describing text. At 2300.7, tailored information based on trigger event is published from 2300.5, the analytical, synthesis and fusion engine to populate virtual shared data spaces of dynamically created mission cells at 2300. As illustrate in FIGS. 13-19 and described with associated text herein, completes dynamic and adaptable instantiation as part of a larger cyber-kinetic C2/BM SoSs integration. At 2300.8 the mission execution and BDA occurs as described herein, but as a C2/BM SoSs processing of the analytical framework, FIG. 8.

Figure 24:
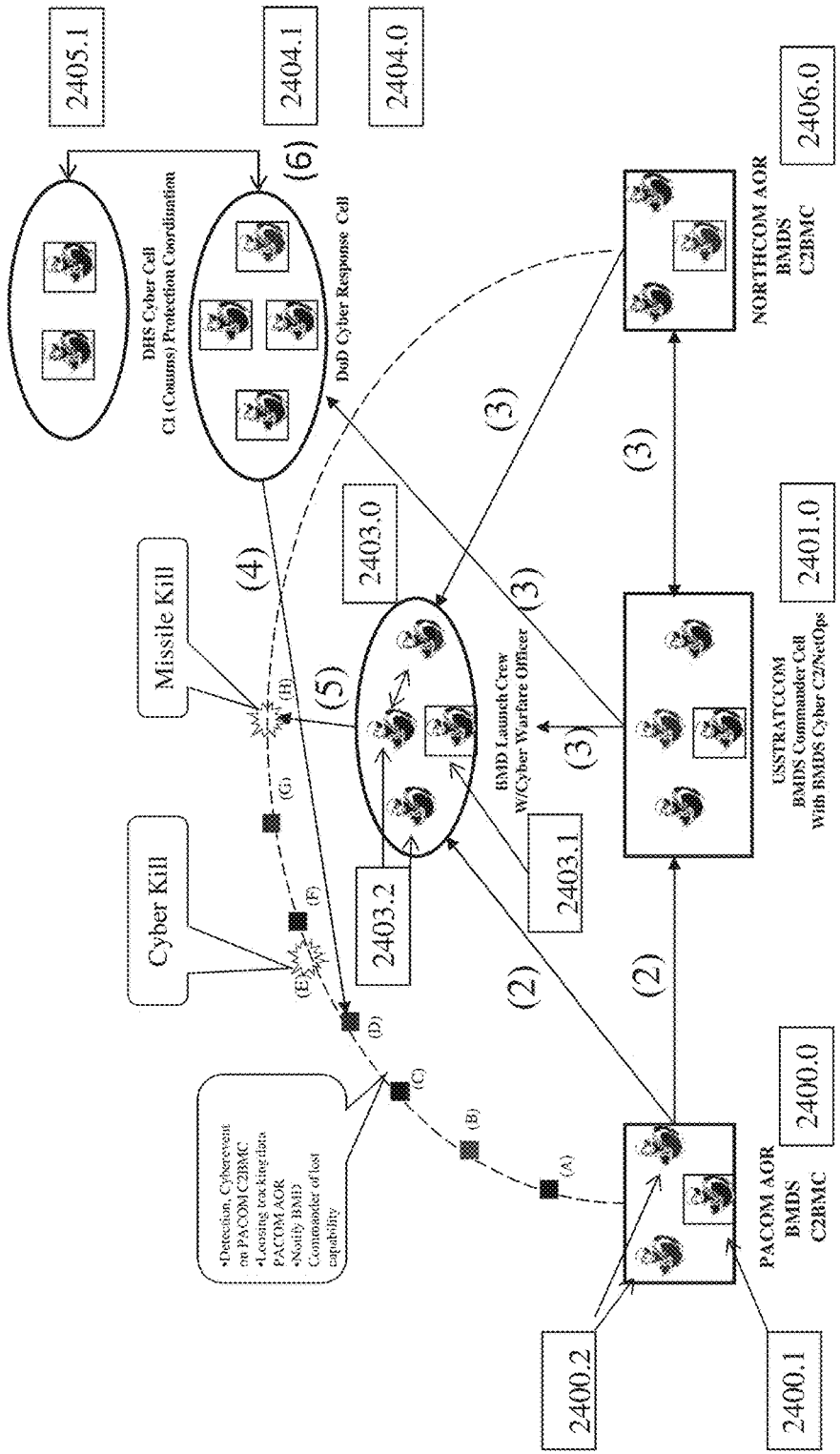
FIG. 24 is a use case scenario illustrating how the invention can be applied to a SoSs real-time integrated physical (kinetic) and cyber operational engagement that occurs simultaneously. It is useful for illustrating the architecture used to instantiate a SoSs C2/BM global enterprise.

A SoSs hypothetical scenario example integrating cyber C2/BM and kinetic (C2/BM global missile defense (GMD)) is illustrated in FIG. 24.

Coding for FIG. 24 Diagram
    Square boxes are major command centers
    Ovals are operational cells associated with major command centers
    Non-square encased operators are missile defense related actions and activities
    Operators encased in a boxes are cyber operators, symbols are cyber warfare related actions and activities
    ARROWS indicate notification, exchange of data, coordination and other operational activities to ensure mission success For this example scenario, it is assumed appropriate cyber C2/BM systems are in place and will perform at real-time cyber "opt tempo" speeds to exchange data, perform information handoffs, coordination, collaboration and planning. The numbers 1-5, FIG. 24 represent events of identification, sharing information, coordination and collaboration employing the invention and execution of the analytical framework, FIG. 8 which results in actions to be taken. Letters A-H, FIG. 24 on the curve represent missile tracking in terms of elapsed time and both cyber and kinetic events (cyber and kinetic kills). The activities across both AORs and with USCYBERCOM occur in parallel, they are not sequential.

BMD/CYBER EVENTS Example Scenario (1) Cyber warrior FIG. 2400.1 detects a cyber event that is degrading missile defense at elapsed track time (C). PACOM AOR C2BMC operators 2400.1 and 2400.2 (cyber and kinetic) begin analysis of missile defense and cyber attack implications on the immediate missile defense mission and their AOR. At elapsed time (D), the PACOM AOR BMD capabilities have been degraded.

(2) PACOM AOR C2BMC begins sharing of cyber and missile defense information and coordination with BMD Commander 2401.0 and BMD launch crew 2403.0 Cyber SA and implications of cyber attack are shared and COA development begins. Additionally, cyber and network operators 2400.0, 2401.0, 2403.0 begin remediation of attack and begin to analyze the effects of the cyber attacks and begin recovery of degraded capabilities.

(3) The BMDS Cyber Commander is coordinating missile defense COAs and cyber SA with launch crew 2405.0 and 20600.0. NORTHCOM is receiving cyber and missile defense SA updates and taking C2/BM control of the missile threat and launch. Simultaneously USCYBERCOM is being engaged and COCOMS are sharing cyber SA and other relevant information to plan COAs and engage the cyber threat.

(4) USCYERCOM element 2404.0 engages the cyber threat and neutralizes the attack at elapsed time (E). At elapsed time (F), missile tracking has been restored. At elapsed time (G) tracking is confirmed and engagement of missile threat is resumed.

(5) Missile launch crew 2403.2 engages with interceptor and at elapsed time (H) the incoming missile threat is neutralized.

(6) During engagement, DHS 2405.1 and DoD Cyber Cells 2404.1 sharing cyber data (e.g., critical infrastructure cyber SA) with DOD cyber Cell 2400.0 engaging cyber attackers that may be attacking CI communications vital to BMD.

The above is a hypothetical scenario and it does not necessarily represent actual organizational alignments, command structure or order of battle. However, it is intended to illustrate the opt-tempo and speed of cyber-attacks and the coordination, sharing of information, collaboration of the invention. The invention enable national and joint integration of both a cyber and kinetic C2/BM simultaneously. The invention provides for this tactical, operational and strategic level of integration and asynchronous SoSs execution of the Cyber-kinetic C2/BM analytical framework.

Sophisticated Cyber C2/BM will be integrated with kinetic C2/BM operations—providing a true systems-of-system architecture to enable net-centric (synergistic) effects across cyber and kinetic warfare operations. The third and final system architectural pattern is a peer-processing architecture. This is a special case of P2P in it theoretically employs identical C2/BM software suites across an enterprise, that coordinate and cooperate in a federated manner, The concept was pictorially illustrated in FIG. 6 and FIG. 9.

The cells of the invention can be modeled and emulated as C2/BM system agents, both individual and collectively. Herein are representative definitions of Cyber C2/BM command structures. The invention includes all variances of this definition that can be implemented with the invention. To support C2/BM modeling, emulation and mathematical formulation, cells can be defined and informed using set theory. Sets are defined by their membership relationships and operations, unions' intersections and so on. The invention's cells are sets of cyber operations members. The cells operational behaviors can be characterized by set operations. For example, its cyber mission members define a cell's membership (e.g., intrusion detection cell); that is, a set consists of members. Notation: x "is a member of" A . . . means that x is a member of set A.

In Set Theory diagrams like FIGS. 12 and 16 are called Venn diagrams. We can think of virtual cells as a set that consists of the members of the cell. Notice that there are two BOLD outlined cells in FIG. 12 that are called dynamic cells, which we defined earlier as "group" or "mission" cells. The other cells are referred to as mission cells, because they perform a singular mission. They are also referred to as are persistent cells. These persistent cells, as the name suggests, are always up and operational. From the previous definitions of the inventions operational architecture, persistent cells performing a single cyber mission (e.g., vulnerability assessment); its members will always have the same mission function. However, members may leave a mission or group cell, which is not consistent with members leaving a set and still having the same set (i.e., mission). For example, persistent virtual cells will operate 24 hours a day. But there may be multiple working shifts through the course of a day, so the entire membership of a cell would change during shift changes. Also, unlike sets, we have dynamic cells and groups, which can include members performing a singular mission or members who perform different missions. While it's possible for a dynamic cell or group to have a long life, it will eventually reach a decommissioned state where their computing processes are terminated.

Cyber C2/BM command constructers that support Cyber C2/BM agent-based modeling and emulation are defied. The invention's construct is consistent with, and augments work done at NPS [D. Wijesekera, J. Michael, et al] by providing a cyber analogous Cyber C2 formal structures that can ingrate with the formal BMD C2 structures defined in [D. Wijesekera, J. Michael, et al]. The formal Cyber C2 structures herein integrate and instantiate a SoSs BMDS C2/BM with Cyber the Cyber C2/BM invention. Policies for operating in this SoSs configuration are numerous and all variants that are possible are with the invention are inclusive in the patent. The analytical framework to processes the SoSs operational policies are illustrated in FIG. 3.

Cyber Cell Commander Agent Definition: For the purpose of Cyber C2/BM modeling and emulation, commander cells are defined as commander agents. The invention's Cyber C2/BM operational architecture defines virtual cells that are analogous to cells in a typical military C2 organization. Each cell has a commander. Cells are deployed at the strategic level of command by a strategic cyber commander (SCC); operational level of command by a cyber operational commander (COC); and at the tactical level of command by a tactical cyber commander (TCC). The invention's architecture also provides for the "on demand" creation of dynamic cells and groups as defined earlier herein. These cells and groups have a commander [or leader in civilian organizations] as well, i.e., a dynamic cell commander (DCC). Our formal command structures definitions are intended to be highly adaptable with "on demand" dynamic structuring to meet the uncertainty of who may become an instant stakeholder (i.e., because cyber attacks are crossing organizational and network boundaries). This requirement demands the operational capability to create "on demand" Cyber C2 structures with associated operational process, tools, data, protocols and system capabilities, FIGS. 13-18.

Composing Dynamic C2 Structure Definitions: The invention's agents-based Cyber C2 formal structures that will be employed to emulate and model Cyber C2/BM system while executing the CyberOps Chain (I.e., analytical framework described earlier herein, FIGS. 3,4, 8 and 25. While the steady state of the Cyber C2 structure is usually hierarchical, with three tiers roughly equivalent to strategic, operational and tactical level of command, the invention's modeling and emulation will provide and MS&E experimentation environment with the ability to "on demand" dynamically tune the Cyber C2 structures to maximize performance and effects while engaging emerging or unknown cyber warfare threats (e.g., rapidly establish a C2 structure to coordinate across organizational and network boundaries) in near real-time.

Cyber C2/BM Command Structures Definitions: In order to emulate and model the cyber C2/BM cells, their formal structures are defined. As we have discussed, herein, the cyber C2 cells can be organized as a hierarchical structure familiar to kinetic warfare operators, as the right side of FIG. 16 illustrates. However, as also illustrated in FIG. 16, there is an equivalent peer-to-peer virtual command structure that can map 1:1 to the hierarchical C2 structure. Because of the flexibility of the VO, the virtual C2 organization can form a pure hierarchical structure with three tiers as we illustrated FIG. 16, or manifest itself as a purely peer-to-peer structure; or a hybrid with any desired levels of command.

Consistent with [D. Wijesekera, J. Michael, et al], our SCC has a set of OCCs and each OCC has a set of persistent TCCs. All TCCs read the cyber sensors net (CyberSensorNet) in their network area of responsibility. They generate cyber situational awareness and share cyber sensor net summaries and execution assessments (ExeAssessSt) summaries with their persistent OCCs. As an example, execution assessments have three "states"; they are: execution was "successful" or "partially successful" or "failed." However, more sophisticated metric are inclusive in the invention. And they apply at all levels of command too; summaries are tailored to the commander's needs at their respective levels. OCCs further summarize their cyber sensor net summaries and execution assessments from TCCs and forward to the persistent SCC where a strategic summary occurs from the OCCs inputs. Cyber operations chain (CyberOpsChnSt) has a state value that maps to the each phase of the cyber operations chain described earlier (e.g., in execution state) and again applies at all levels of command; again, the difference being the summaries are tailored to the commander's needs at their respective levels.

As earlier defined herein, the invention's C2 structures can have dynamic cells and groups that can be created across all levels as operationally required, each with its own commander (e.g., enhance operational effects through tailored coordination). Dynamic cells or group DCCs can read all information needed to perform their dynamic mission. They provide summaries of their dynamic missions in the same manner and protocol as persistent cells, but their summaries are tailored to their dynamic mission. For the purpose of this example, C2 structures are bounded by the formal definition below. This Pt recognizes as cyber C2 processes and policies evolve, this formal definition will become much more complex. We purposely excluded the cyber weapons from the formal C2 structure because they are applications that typically reside at the architectural application layer as illustrated in FIG. 6. Formal C2/BM System/SoSs definitions follow.

Definition: A cyber "persistent" command and control structure is a 7-tuple (IDp, scsID, occID, tccID, sccSchema, occSchema, tccSchema,) where IDp is a finite set of identifiers that is a unique to all entities in the Cyber C2 model. ScsID, occID, and tccID are the identifies of the SCC, OCC, TCC and is satisfied by the following condition:

$$IDp = (tccID \square occID \square sccID) \square \{CyberOpsChnSt, ExeAssessSt, CyberSensorNet,\}$$

where sets on the right side are disjoint.

Definition: A cyber "dynamic" command and control structure is a 3-tuple (IDd, dccID, dccSchema,) where IDd is a finite set of identifiers that is a unique to the "dynamic" Cyber C2 model. dccID identifies DCC:DCC is defined as n!/k!, where n is the number of cell commanders and k is pairing combinations created with "on demand" dynamic cell integration across C2 levels, DCC is the highest ranking commander in the dynamic pairing and is satisfied by the following conditions:

$$ID d = (dccID) \square (tccID \square occID \square sccID) \square \{CyberOp\text{-}sChnSt, ExeAssessSt, CyberSensorNet,\} \text{ where sets on the right side are disjoint.}$$

DCC parings are defined as:

DCC={DCC:SCC☐DCC and OCC☐DCC and TCC☐DCC} or

DCC={DCC:SCC DCC and OCC☐DCC}.

or

DCC={DCC:SCC☐DCC and TCC☐DCC} or

DCC={DCC:OCC☐DCC and TCC☐DCC}

Definition: The CyberOpsChnSt identifier is satisfied as follows:
CyberOpsChnSt(x, t): is a state variable x with values "situational awareness" or "planning" or "COA selection" or "execution" "execution assessment" or "feedback" or "SA update." These states correspond to the phases (or states) of the CyberOps Chain at any point in time (t).
Definition: The ExeAssesSt identifier is satisfied as follows: ExeAssess(y, t:y is a state variable with vales "failed" or "partial success" or "success" at any point in time (t).
Analogues to [D. Wijesekera, J. Michael, et al] sccSchema, occschema, tccSchema are sets of well typed instances of the following:
SCC(id, myPeers, CyberOpsChnSt, ExeAssess,CyberSensorNet)
OCC(id, mySuperiors, myTCCs, CyberOps, myChnSt, ExeAssess, CyberSensorNet)
TCC(id, mySuperiors, myOCC, CybetOpsChnSt, ExeAssess, CyberSensorNet)
DCC(id, myPeers(dccID), CyberOpschSt, ExeAssess, CyberSensorNet))
From, [D. Wijesekera, J. Michael, et al] the well typedness of the schema instances are defined as follow:
1. All instances of myPeers in sccSchema are subsets of sccID.
2. All subordinate instances in sccSchema are subsets of occID☐tccID and all subordinate instances of occID are subsets of tccID
3. All superior instances in tccSchema are singleton subsets of occID☐tccID and all superior instances of occSchema are singleton subsets of sccID
4. All superior instances in dccSchema are determined by singleton subsets such that sccID>occID>tccID.
Again, derived from [D. Wijesekera, J. Michael, et al] Lemma 1 states some simple conditions satisfied by the cyber C2 structure.
Lemma 1; C2 Structures satisfy the following conditions
1. Every C2 structure is a forest of trees and peer structures simultaneously,
2. Every tree in a C2 structure can have n levels iff there is at least one leaf in the tree and every path from a root to a leaf list the agents in the order [SCC>OCC>TCC]
3. When DCC agents exist in the C2 structure, the order follows 2, starting with the highest level commander in the dynamically created leaf The dynamic creation of SoSs C2/BM mission configuration is illustrated in FIG. 17. FIG. 17 also demonstrates another instantiation, inclusive of different missions and their mission systems, thus creating a SoSs from multi major missions' areas; reference the STRATCOM mission cube for major mission areas and their relationships to submissions and METs, FIG. 22. At 1705.0 the integrated missions and systems are created, they are: 1702.2, a cyber CPT cell, (note its integration, dotted line, with the Cyber IR Cell 1702.1. The dotted line indicates coordination, synchronization, or any other related activities; also Inclusive in the SoSs mission integration is a space cell, 1706.0 and electronic warfare (EW) cell, 1707.0. The intent in this illustration is for the cells, 1702.2, 1706 and 1707 to be static cells, so the < . . . >dynamic group cell can be demonstrated. The commander of this mission is the area of responsibility (AOR) 1. What also occurs at 1708.0 is the dynamic creation of a group cell, defined earlier herein. Group cells can be static or dynamic, but they are distinguished from mission cells because they have members from multiple mission areas as is illustrated at 1702.8 In the case illustrated, members from the integrated static cells attached have created a group cell to work a specific tasks that involves member from their perspective areas.

The C2/BM configuration is identical to FIG. 3, with the exception of the inclusion of the STRATCOM major mission integration. AOR 1, 1701.0 could be another major combatant command (COCOM); e.g., CENTCOM, EUCOM. The C2/BM configuration illustrates the ease of integrating major mission areas across major global commands or a geographically disturbed enterprise. It follows, submissions and their associated METs will map to cells as needed per mission requirements. As described in FIGS. 16 and 17, the hierarchy of command can be dynamically established and maintained, while simultaneously operating as peers with federated autonomy.

The dynamic cell creation in FIGS. 13, 15-17 is established and supported by the system architectural service descriptions in FIGS. 5-7, 9-13 and operational architectural illustrations in FIGS. 13-25. The analytical framework applies as described in FIGS. 3, 4, 8, and 20-25.

Figure 25:
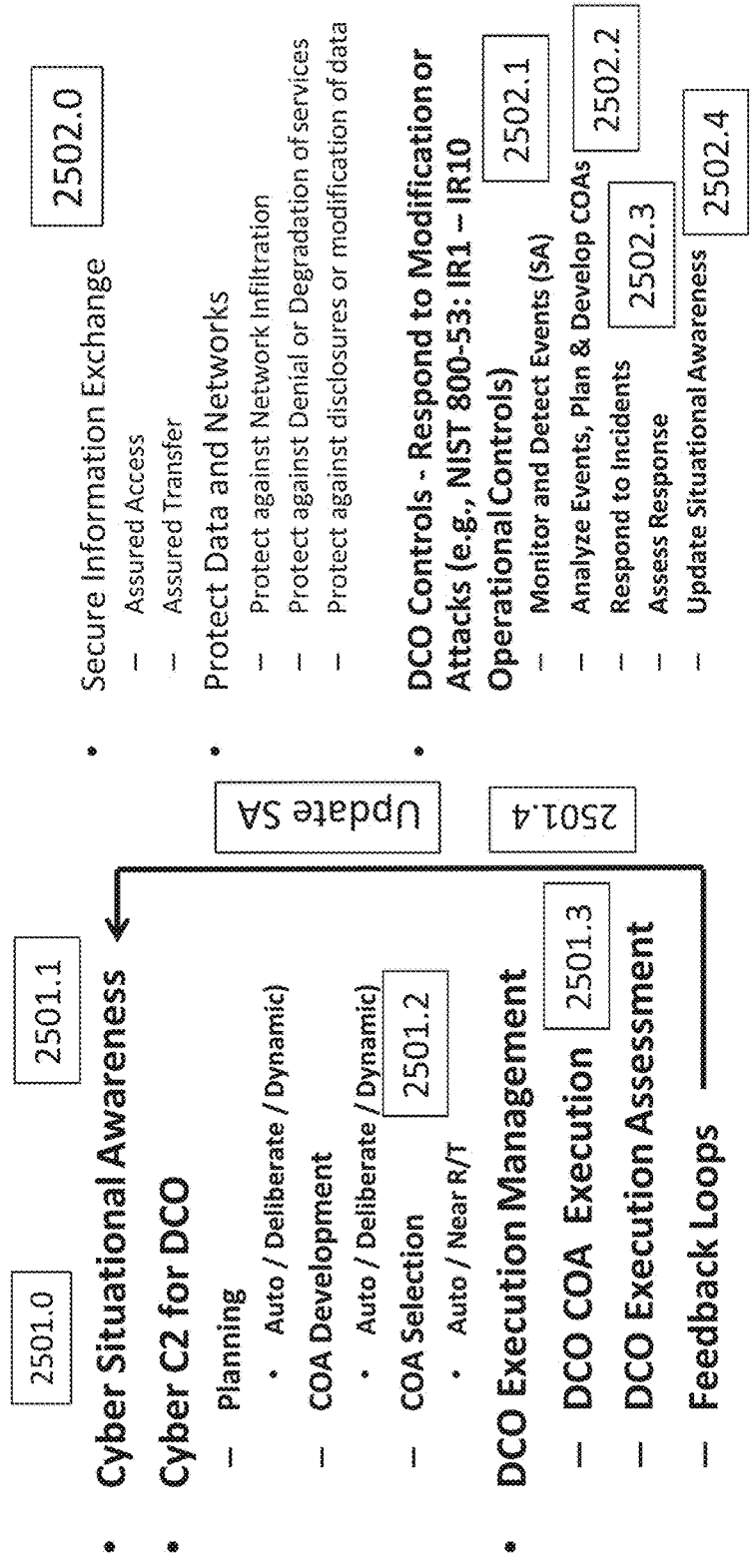
FIG. 25 illustrates how cyber security controls can be managed by the inventions C2/BM while employing the analytical framework (i.e., CyberOps Chain). It is useful illustrating how the analytical framework used for cyber operations can be integrated with cyber security for synergistic effects.

FIG. 25 illustrates a mapping of NIST 800-53 cyber security control intrusion response to the CyberOps chain phases. 2501.* maps to 2502.* with a 1:1 mapping to the CyberOps chain analytical framework. This is an illustrative example of managing cyber security controls with the invention by employing the CyberOps Chain's analytical framework to conduct MOPs and MOE analysis of cyber security controls as a capability of defensive cyber operations or security operations.

Furthermore, the present invention includes a System and system-of-systems (SoSs) architectures, methods and integration for dynamically and adaptively, in near real-time (NRT) managing and executing; i.e., command and control (C2 Cycle: situational awareness, planning, course-of-action (COA) development and selection) and execution or battle management EM/BM Cycle: execution of selected COA, assessment of COA execution, and update of SA via execution assessment; i.e., feedback loops); e.g., EM or BM across a global cyber enterprise, global cyberspace or integration of cyber and kinetic across a global enterprise or global environment; integrates, synchronizes and executes with kinetic operations employing a adaptive and dynamic mixing and matching of capabilities for optimal effects; in NRT adaptively and dynamically tunes the architecture implementation (invention) to measure and maximize effects. The methods involve execution of a Cyber Operations "CyberOps" Chain of interlocking C2 and EM or BM cycles or the integration with a kinetic "Kill Chain", defined in the Department of—Defense, to integrate and effect optimal cyber/kinetic integration and mission outcomes—utility. A software framework that rapidly facilitates new capability integration and adaptively dynamically harmonizes its operational and system/SoSs architectures in NRT to optimize mission performance and effectiveness (e.g., resilience)—MOPs to MOEs (M2) analysis by employing an information value analysis chain (M2IVAC). The architecture can dynamically instantiate centralized or distributed C2 forms and other derived forms. Further, it can instantiate and manage multiple forms simultaneously. For the remainder of the discussion, BM will be used. The following diagram illustrates the first order integrated processes; i.e., Cyber and kinetic operational chains employed by the invention. Note they are identical syntactically, but phases of the cycles are germane to their respective operational domains, but because of this congruence, integration of cyber and kinetic is made more seamless.

What is claimed is:

1. A cyber command and control system for a global computing environment, comprised of:
   a plurality of global shared data spaces configured for selectively storing and retrieving cyber data according to a plurality of topics;
   a plurality of virtual cells and at least one commander cell, each cell having at a set of capabilities and at least one computing device electronically connected to at least one local shared data space, a suite of applications and a message platform, wherein each computing device is configured to selectively collect and message cyber data according to at least one mission-specific topic of the plurality of topics;
   the messaging platform configured to transmit messaged cyber data according to a predetermined message configuration;
   a system-of-systems architecture configured to (a) implement a peer-processing configuration across each shared data space, each computing device, and each suite of applications; and (b) implement a global sharing configuration of each local shared data space with the plurality of global shared data spaces; and
   a user interface integrating with each cell for the at least one commander cell to selectively establish (a) a predetermined mission that defines the at least one mission-specific topic; and (b) the predetermined message configuration.

2. The system of claim 1, wherein the plurality of global data spaces further includes a central data store across which the system-of-systems architecture is configured to implement the peer-processing configuration and the global sharing configuration.

3. The system of claim 1, wherein the plurality of global shared data spaces is virtual.

4. The system of claim 3, wherein the plurality of virtual global shared data spaces is cloud based.

5. The system of claim 1, wherein the predetermined message configuration is at least one of a publish-subscribe and a request-reply message configuration.

6. The system of claim 1, wherein the predetermined message configuration is a publish-subscribe message configuration.

7. The system of claim 1, wherein the predetermined message configuration is only a publish-subscribe message configuration.

8. The system of claim 1, wherein the predetermined message configuration is a request-reply message configuration.

9. The system of claim 1, wherein the system-of-systems architecture is configured to implement only the peer-processing configuration.

10. The system of claim 1, wherein the system-of-systems architecture is configured to implement only the global sharing configuration.

11. The system of claim 1, wherein the system-of-systems architecture is configured to implement only the peer-processing configuration, and only the global sharing configuration.

12. The system of claim 1, further comprising at least one dynamic cell formed from a portion of the plurality of virtual cells by comparing each respective set of capabilities to the predetermined mission.

13. The system of claim 12, wherein the at least one dynamic cell is reformed when the predetermined mission is re-established through the user interface.

14. The system of claim 13, wherein the user interface is configured to measure a performance output of the at least one dynamic cell.

15. The system of claim 14, further comprising an analytic database connected to the user interface, wherein the analytic database is configured to dynamically adapt the predetermined mission base in part on the performance and effects output.

* * * * *